US008650235B2

(12) United States Patent
Torosyan

(10) Patent No.: US 8,650,235 B2
(45) Date of Patent: *Feb. 11, 2014

(54) EFFICIENT FUNCTION GENERATOR USING CASE DETECTION AND OUTPUT SELECTION

(76) Inventor: Arthur Torosyan, La Crescenta, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 13/184,958

(22) Filed: Jul. 18, 2011

(65) Prior Publication Data

US 2011/0276613 A1 Nov. 10, 2011

Related U.S. Application Data

(63) Continuation of application No. 11/380,880, filed on Apr. 28, 2006, now Pat. No. 7,984,090.

(60) Provisional application No. 60/676,483, filed on Apr. 30, 2005.

(51) Int. Cl.
*G06F 1/02* (2006.01)

(52) U.S. Cl.
USPC ........................................... 708/270

(58) Field of Classification Search
CPC ....... G06F 17/17; G06F 1/0356; G06F 7/552; G06F 7/66; G05B 19/4103
USPC .................................. 708/270–277
See application file for complete search history.

(56) References Cited

U.S. PATENT DOCUMENTS

2011/0119520 A1\* 5/2011 Khan et al. .................... 708/276

\* cited by examiner

*Primary Examiner* — Tan V. Mai
(74) *Attorney, Agent, or Firm* — Khoo Patent Services

(57) ABSTRACT

A function generator for a digital system includes a plurality of sub-function generators. Each sub-function generator has an input that receives a respective input value and has an output that provides a respective output value responsive to the respective input value. A case detector receives a system input value and selectively routes at least a first portion of the system input value to the input of at least one selected sub-function generator. The case detector selects the selected sub-function generator in response to at least a second portion of the system input value. The case detector further suppresses transitions of data on the input of at least one non-selected sub-function generator. The case detector further selects the respective output value provided by the at least one selected sub-function generator and provides the selected respective output value as a function generator output value.

20 Claims, 24 Drawing Sheets

EFFICIENT FUNCTION GENERATOR USING CASE DETECTION AND OUTPUT SELECTION

RELATED APPLICATIONS

This application is a continuation of application Ser. No. 11/380,880, filed on Apr. 28, 2006, now U.S. Pat. No. 7,984,090, which claims the benefit of U.S. Provisional Application No. 60/676,483, filed on Apr. 30, 2005, both of which are incorporated by reference in their entireties.

BACKGROUND OF THE INVENTION

1. Field of the Invention

The present invention is in the field of function generators and direct digital frequency synthesizers for digital integrated circuits.

2. Description of the Related Art

Minimal power consumption is one of the most desirable characteristics for an integrated circuit (IC), particularly in electronic systems powered by batteries. The demand for wireless, mobile, and computation intensive applications coupled with the desire for longer battery life puts a tremendous amount of pressure and importance on low-power ICs.

SUMMARY OF THE INVENTION

The case detection and output selection method described herein provides the means to perform an arbitrary function generation in a power-efficient manner. The described case detection and output selection method can also be used to maximize and minimize other desirable characteristics (e.g., maximize the throughput and data rate of the function generator and minimize power consumption).

Large systems usually comprise multiple functional blocks that process data and operate with one another to perform the overall operation of the system. These functional blocks comprise smaller units that perform respective functions determined by the corresponding functional blocks of the units. For example, in a digital system, the efficiencies of the circuits performing these functions have a direct impact on the overall efficiency of the system. The method of function generation via the case detection and output selection method described herein has a number of very attractive properties (low power consumption being one such property) that contribute to the overall efficiency of a system utilizing this method. Other desirable properties of the case detection and output selection method include, for example, the ability to efficiently share resources among multiple units to achieve high data rates with minimal power consumption, and the ability to mix multiple function generation methods to strike a desirable balance between power consumption, data rate, and die size in a manner such that the overall system collectively benefits from the desirable properties of all the methods being utilized. Furthermore, this method provides the ability to use lookup tables for function generation that can be programmed with arbitrary contents to enable the system to obtain maximum system performance. The method obtains the desired combination of performance and low power consumption by performing efficient case detection, building efficient sub-function generators, and performing efficient output selection (e.g., multiplexing). The sub-function generators are enabled only when they are required to perform a computation. When the sub-function generators are implemented using small lookup tables (e.g., ROMs), the sub-function generators can be programmed with arbitrary contents.

Power consumption in integrated circuits, for example, is directly affected by the "toggling activity" of signals. Configuring a block to operate (e.g., "toggle") only when the block needs to compute an output value minimizes the overall power consumption. Therefore, given a certain operation, a number of cases may be identified and the desirable outcomes corresponding to these cases may be stored or computed via efficient modules that are optimized specifically for the case for which they are considered. When an input is presented, a corresponding case is identified and only the module corresponding to that specific case (e.g., only the lookup table containing the corresponding result) is activated to retrieve the correct result. Furthermore, the case identified from the input controls a multiplexing operation to route the result obtained from the activated module to the output.

The efficiency of the disclosed system and method results from performing case detection on input values in an efficient manner, activating only the function generator that corresponds to the detected case, and efficiently multiplexing the result of the activated function generator to the output. For example, for power-consumption efficiency, the disclosed method performs case detection on the input values in a "minimal signal-toggling" manner to activate only the function generator that corresponds to the detected case, and multiplexes the result of the active function generator to the output in a "minimal signal-toggling" manner.

Since the disclosed system and method does not impose any requirements and/or restrictions on the function generators (e.g., in the case where the function generators are implemented via lookup tables, the lookup tables can be programmed with arbitrary contents), the disclosed system and method is able to provide arbitrary function generation with arbitrary feasible performance characteristics. A direct digital frequency synthesizer (DDS) is disclosed as an example of one embodiment of a digital system in accordance with the disclosed system and method.

BRIEF DESCRIPTIONS OF THE DRAWINGS

Certain embodiments in accordance with the present invention are described below in connection with the accompanying drawing figures in which.

Figure 16A:
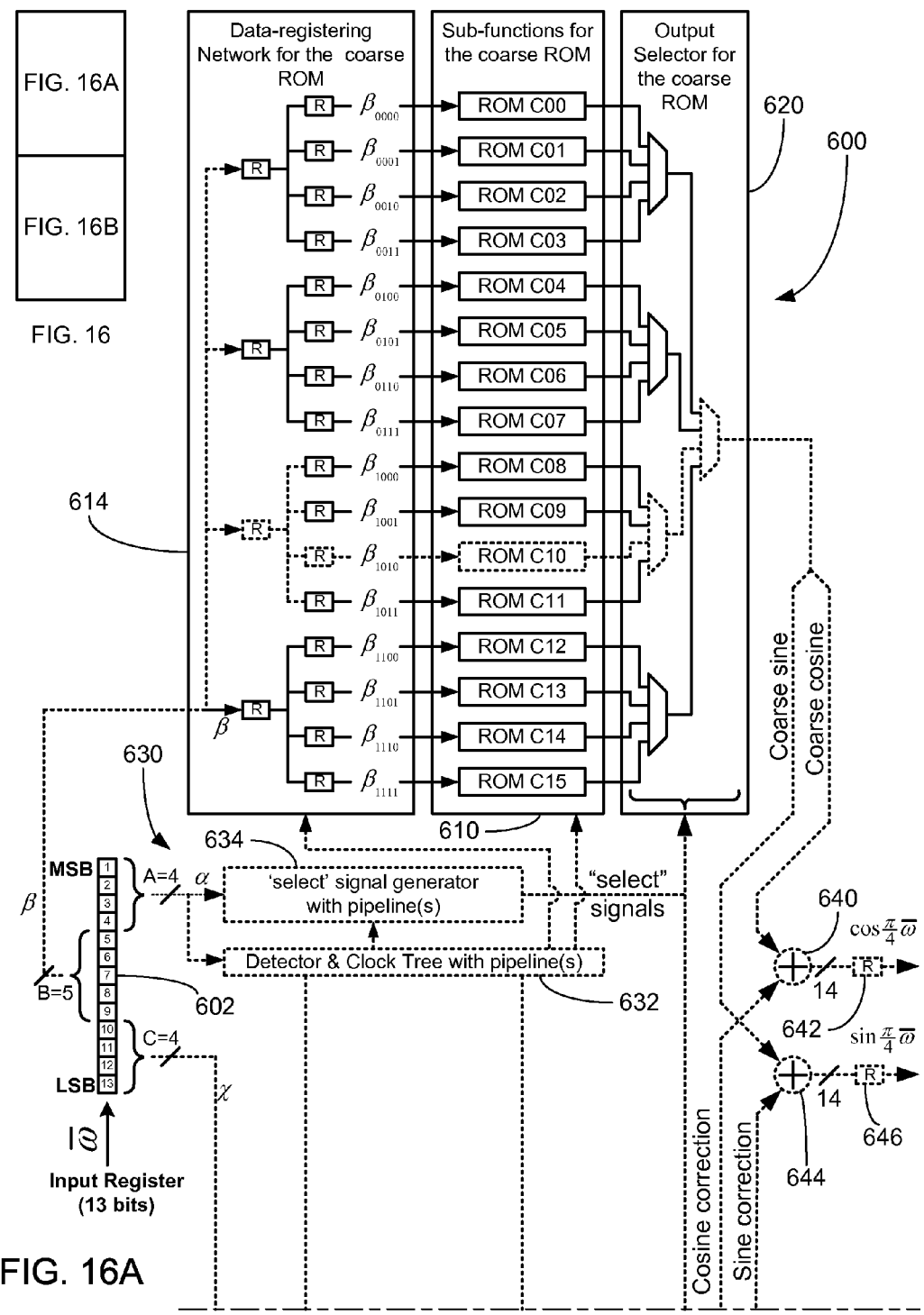
Figure 16B:
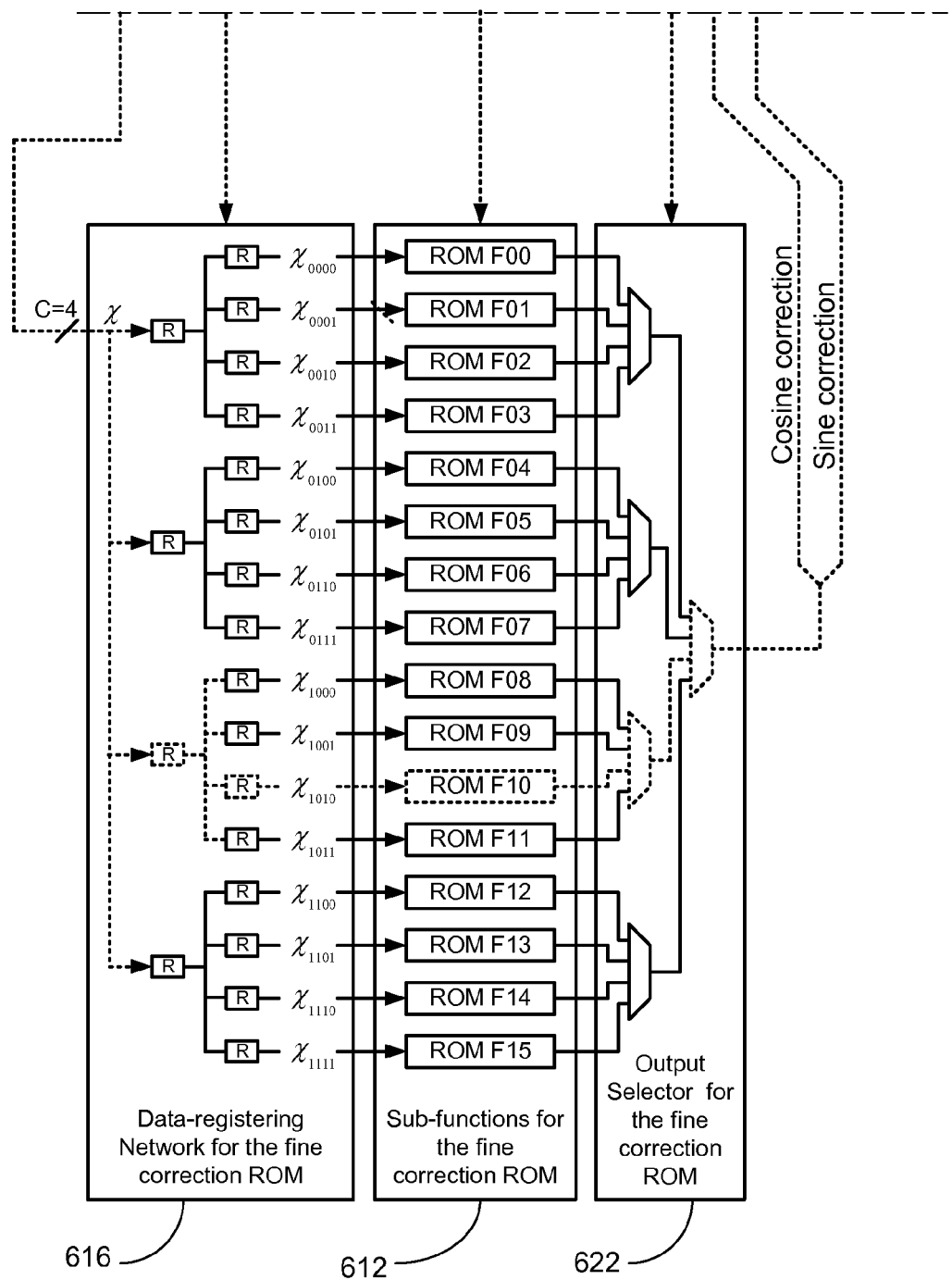
Figure 17:
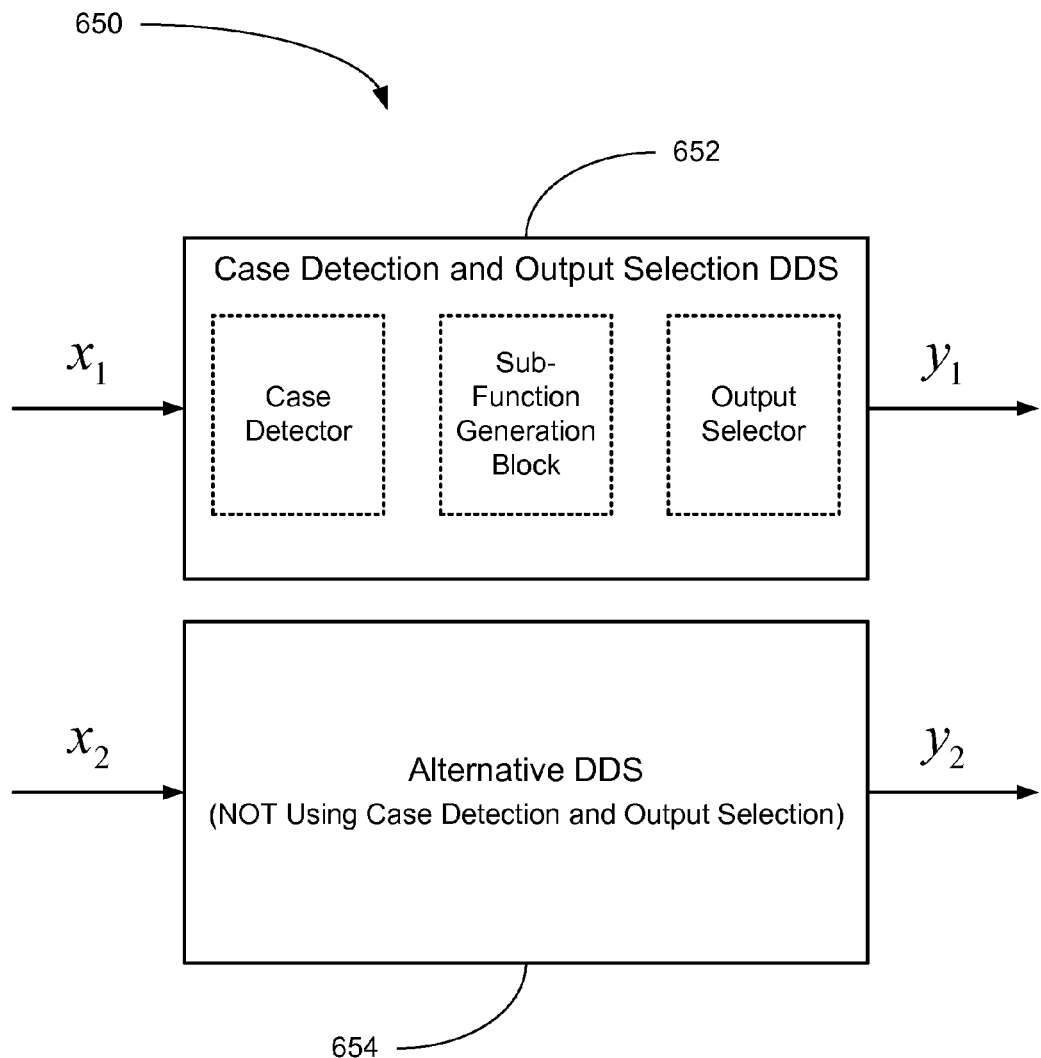
Figure 18:
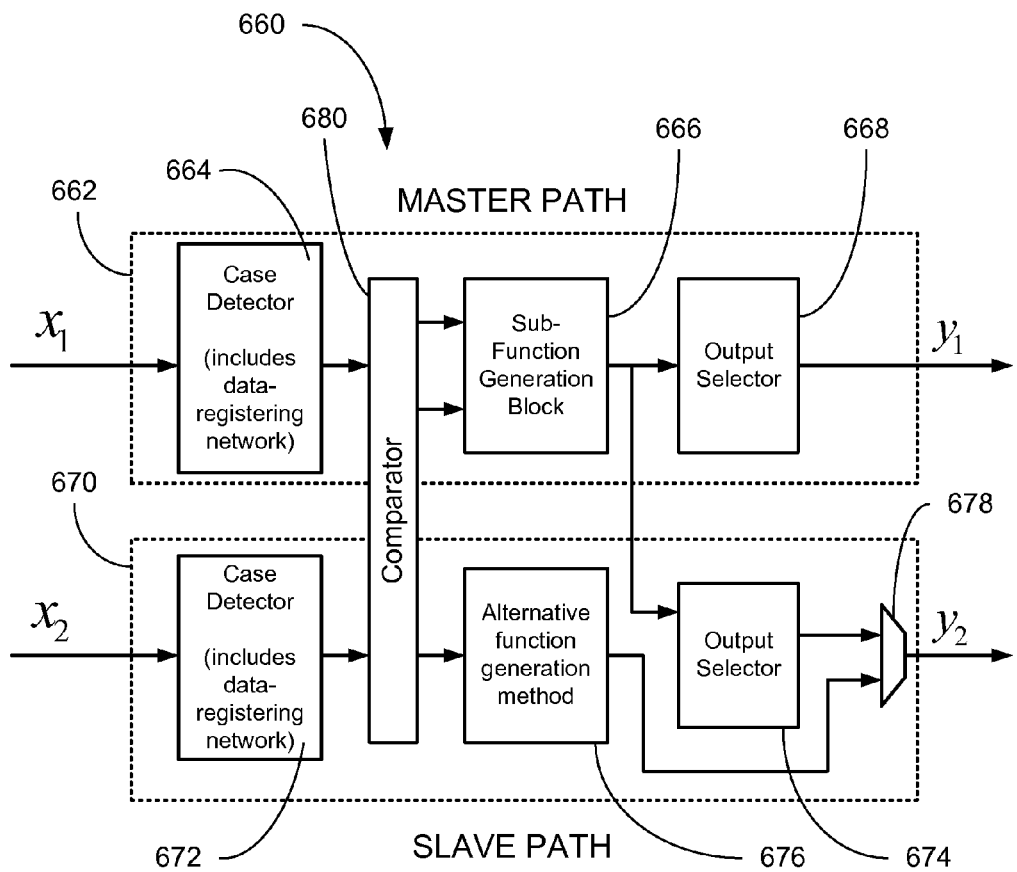
Figure 19:
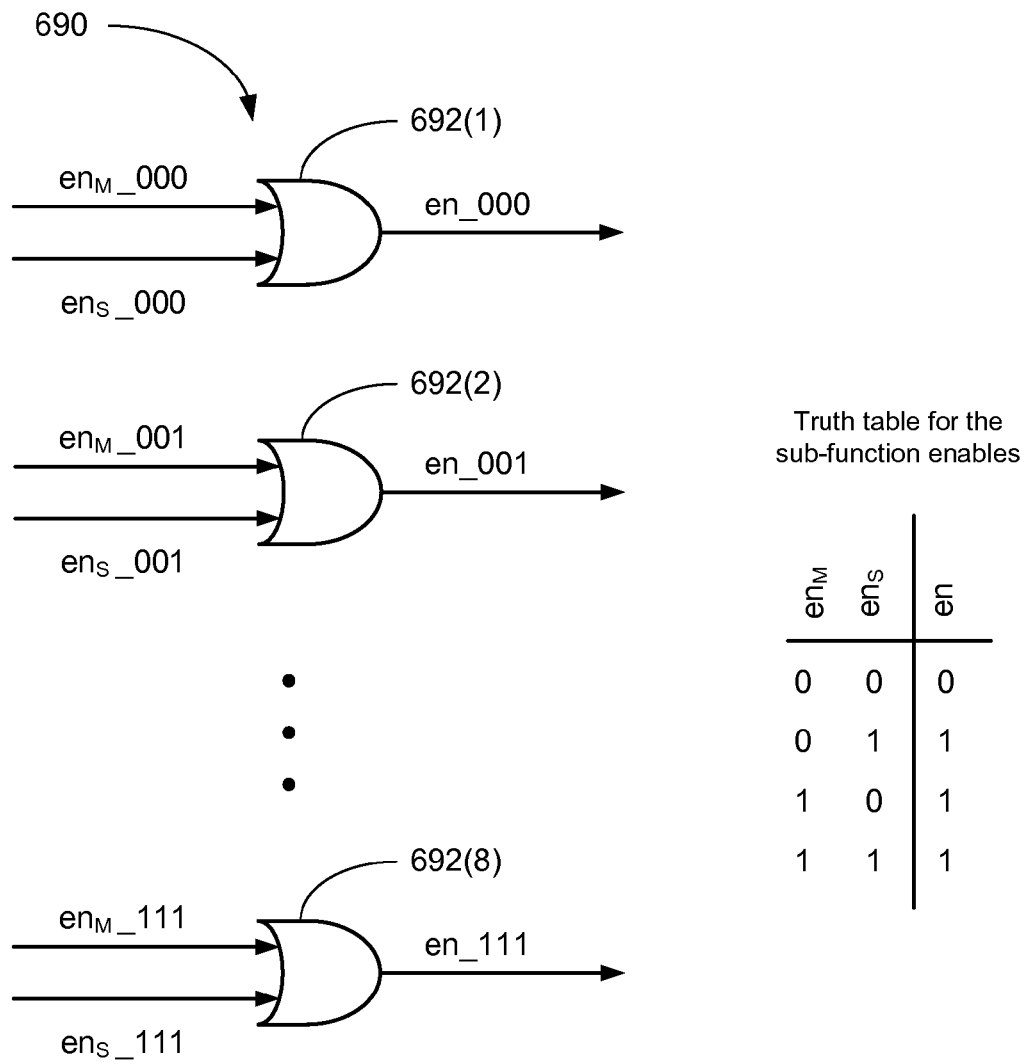
Figure 20:
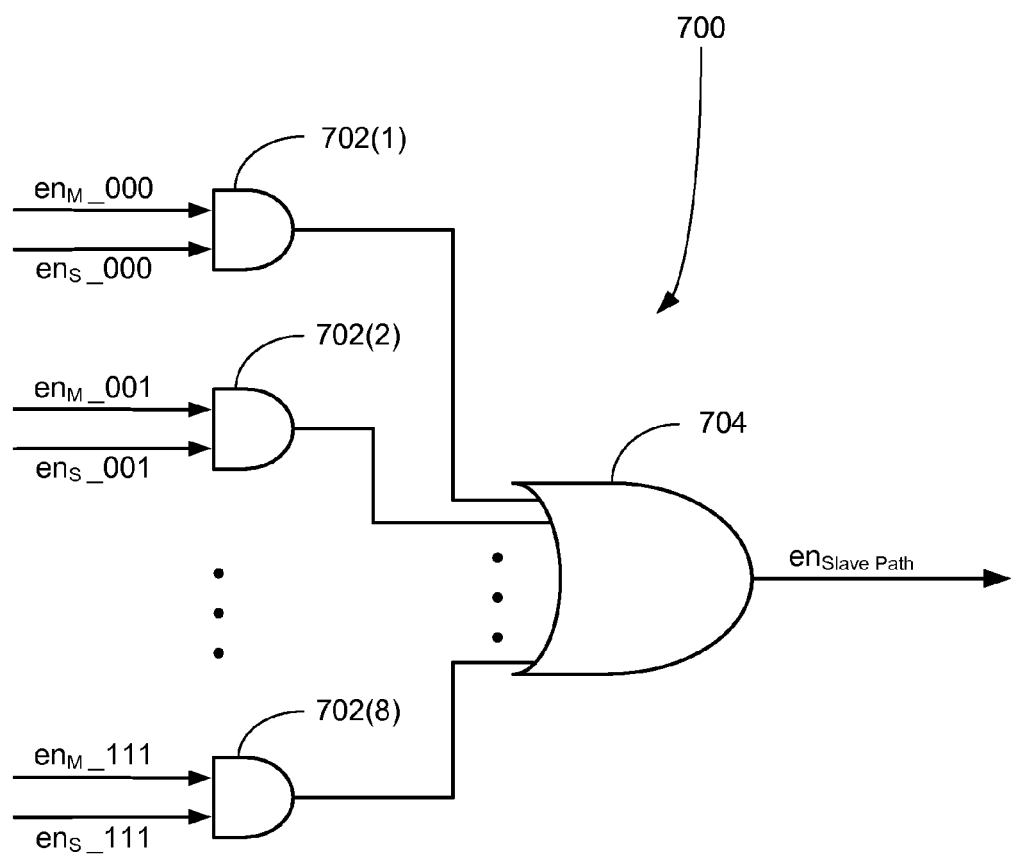
Figure 21:
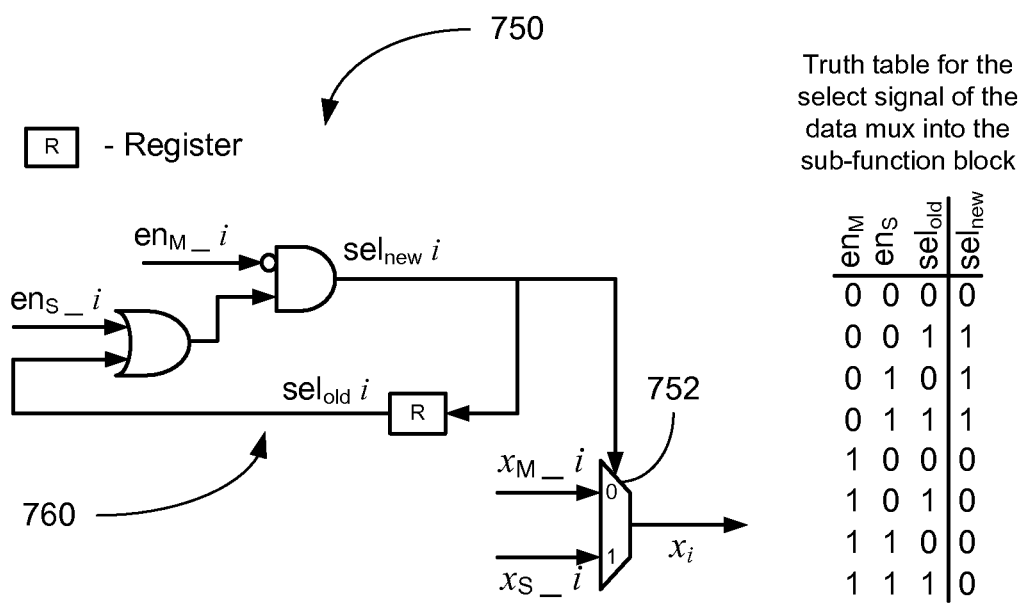

FIG. 16, comprising FIGS. 16A and 16B, illustrates an implementation of Sunderland's ROM compression technique using the case detection and output selection method;

FIG. 17 illustrates a block diagram of a hybrid function generator;

FIG. 18 illustrates a block diagram of a master/slave hybrid multipath function generator;

FIG. 19 illustrates an implementation of logic for generating enables for the sub-functions obtained from the enables of the master and slave paths;

FIG. 20 illustrates an implementation of logic for generating the enable signal for the slave path of FIG. 18; and FIG. 21 illustrates an implementation of data multiplexing logic for the i-th sub-function generator in the master path of FIG. 18.

DETAILED DESCRIPTIONS OF PREFERRED EMBODIMENTS

Figure 1:
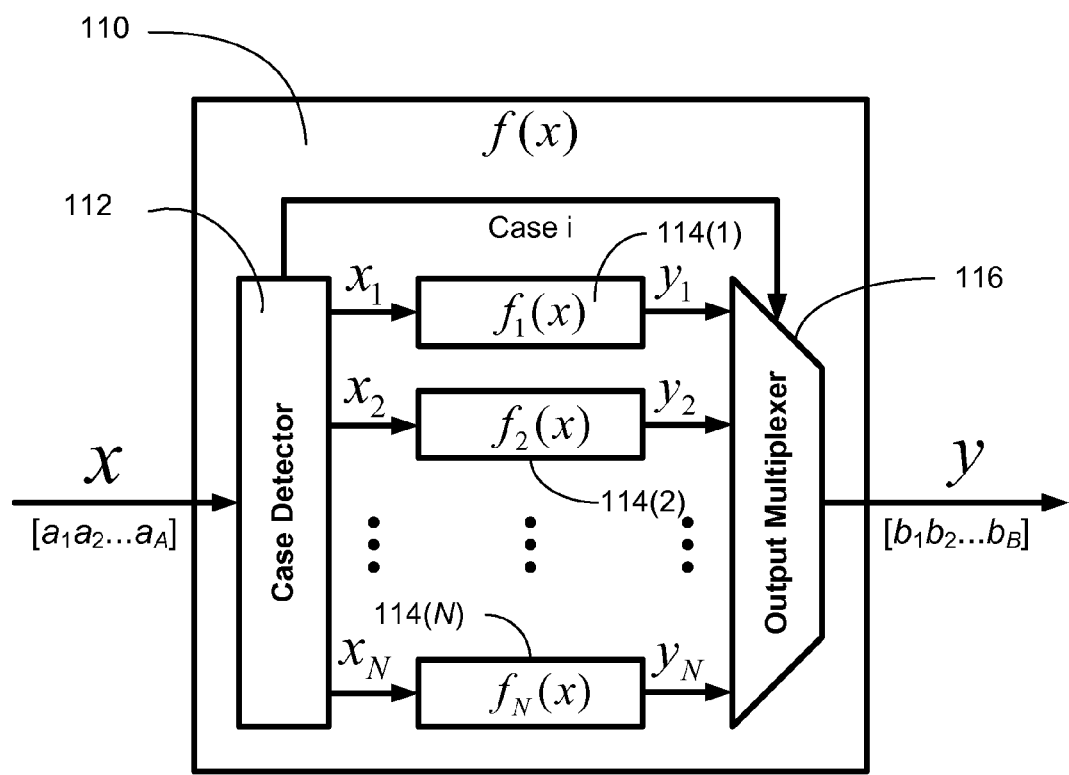
FIG. 1 illustrates a block diagram of a function generator that includes a case-detector, a plurality of sub-functions, and an output multiplexer.

FIG. 1 illustrates a block diagram of a function generator 110 that generates a function $f(x)$. The function generator 110 includes a case-detector 112, a plurality of sub-function generators (e.g., sub-function generators 114(1), 114(2) ... 114(N)), and an output multiplexer 116. The function generator 110 accepts A inputs $a_1, a_2, \ldots, a_A$ and produces B outputs $b_1, b_2, \ldots, b_B$, where A and B are any integers greater than zero. The input-output relationship(s) of the function generator 110 can be expressed in terms of a single-input x and single-output y as $y=f(x)$, where the single-input x is constructed from $a_1, a_2, \ldots, a_A$, and where the single output y is constructed from $b_1, b_2, \ldots, b_B$. One such construction for finite-precision digital inputs ($a_1, a_2, \ldots, a_A$) and digital outputs ($b_1, b_2, \ldots, b_B$), for example, is simple concatenation (e.g., $x=[a_1, a_2, \ldots, a_A]$ and $y=[b_1, b_2, \ldots, b_B]$). For the purpose of discussing of the disclosed system and method, a single-input and single-output function $y=f(x)$ is considered without any loss of generality.

The method disclosed herein is based on a function partitioning technique that enables the mapping of the input x into the output y (e.g., $y=f(x)$) via an arbitrary number (N) of collectively exhaustive sub-functions $f_1(x), \ldots, f_N(x)$. The case detector 112 operates as a control system. Given an input x, the case-detector 112 determines which sub-function the input x corresponds to and activates only that specific sub-function generator (e.g., one of the sub-functions 114(1), 114(2) ... 114(N)) that generates the particular sub-function. For example, the sub-function generator 114(1) is activated to generate $y_1$ via the sub-function $f_1(x)$, and the sub-function generator 114(N) is activated to generate $y_N$ via the sub-function $f_N(x)$. The output multiplexer 116 is responsive to the case detected by the case detector 112 to efficiently route the results generated by the selected sub-function generator to the output y.

The partitioning of the function $f(x)$ need not necessarily be mutually exclusive and/or collectively exhaustive. Although the maximum efficiency will be most likely obtained from a mutually-exclusive and collectively-exhaustive partitioning of the function $y=f(x)$, this choice is not a requirement for the disclosed method. Also, the disclosed method is explained and exemplified herein with applications using binary digital arithmetic (e.g., where the input x and output y are represented using binary digital numbers), but the method is not restricted to any such representation and can be applied to any system that can be expressed as a function $y=f(x)$.

When the input x to the function generator 110 in FIG. 1 corresponds to case i, where $1 \leq i \leq N$, only the sub-function generator 114(i) that generates the sub-function $f_i(x)$ needs to be operational. Therefore, although the system of FIG. 1 comprises N+2 functional units (e.g., the case detector 112, the N sub-function generators 114(1), 114(2), ... 114(N), and the output multiplexer 116), for any input x only three units need to be operational—the case-detector 112, the sub-function generator 114(i) corresponding to the input case i, and the output multiplexer 116. When the sub-function generators 114(1), 114(2), ... 114(N) are implemented to consume minimal or no resources when not operational, the total resources necessary to generate the output y for the input x corresponding to case i are the sum of the resources required by the case-detector 112, the operational sub-function generator 114(i), the output multiplexer 116, and the minimal or no additional resources consumed by the non-operational sub-function generators. The cost function C(i) for generating the output y for input x corresponding to case i can be expressed as:

$$C(i) = G(i) + B(i) + O(i) + \sum_{j=1, j \neq i}^{N} b(j) \quad (1)$$

where G(i), B(i), and O(i) are the costs of operating the case detector 112, the sub function 114(i), and the output multiplexer 114 for case i, respectively, and b(j) is the cost associated with each sub-function $f_j(x)$ when it is not required to produce an output (e.g., when $j \neq i$). The efficiency of this approach stems from the fact that the sub-functions can be disabled by the case-detector 112 such that $b(j) \approx 0$ (or even $b(j)=0$ in some implementations) and such that $B(i) << C(f(x))$, where $C(f(x))$ denotes the cost associated with an alternative implementation of a function generator $f(x)$ to produce the output y=ƒ(x) in a conventional manner. Efficient implementations for the case detector 112 and the output multiplexer 116 are disclosed herein, which make the overall system operating cost C(i) much less than the operating cost of the alternative function generator ƒ(x) (i.e., C(i)<<C(ƒ(x))).

Figure 2:
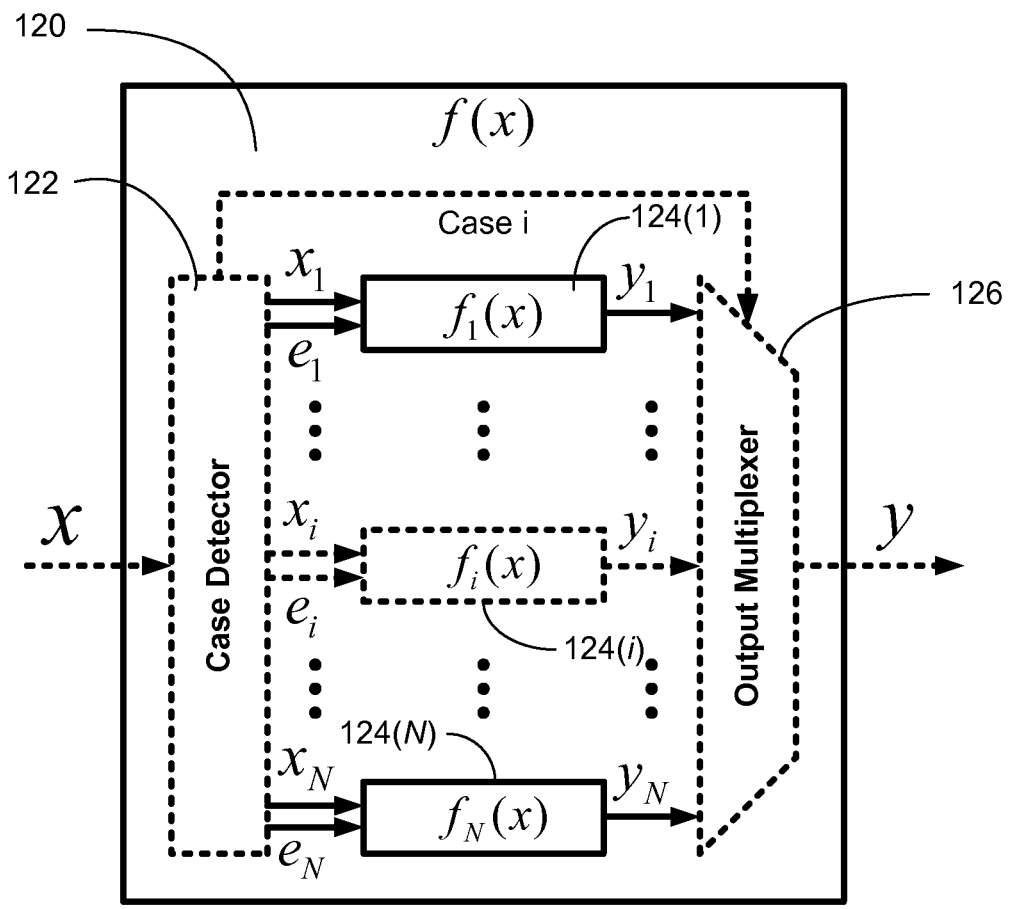
FIG. 2 illustrates a block diagram of a function generator that includes a case-detector, a plurality of sub-functions, and an output multiplexer wherein one sub-function is enabled and the other sub-functions are disabled.

FIG. 2 illustrates a block diagram of a function generator 120 that includes a case-detector 122, a plurality of sub-function generators 124(1), . . . 124(i), . . . 124(N), and an output multiplexer 126, wherein, at any time, only one of the sub-function generators is enabled and the other sub-function generators are disabled. In particular, only the sub-function generator needed to generate a desired sub-function is activated, and the sub-function generators not required to generate the desired sub-function are not activated. For example, in FIG. 2, the elements of the function generator 120 required to generate the function ($f_i(x)$) for an input x corresponding to the case i are highlighted with dashed lines. In particular, the three required operational blocks in FIG. 2 are the case detector 122, the sub-function generator 124(i), and the output multiplexer 126.

For a system that accepts a binary digital input x and produces a binary digital output y, the presented method can be applied to achieve an efficient system implementation. With a W-bit input x and a D-bit output y, the function y=ƒ(x) maps $2^w$ possible input cases to their corresponding D-bit outputs. While W dictates the total number of mappings performed by the function ƒ(x), D dictates the precision of each mapped result y. For example, considering the most-significant bit (MSB) of the input x, the function ƒ(x) can be partitioned into two collectively exhaustive sub-functions $f_0(x)$ and $f_1(x)$ corresponding to '0' and '1' for the MSB of input x, respectively. Similarly, ƒ(x) can be partitioned into $2^K$ collectively exhaustive sub-functions $f_{00\ldots 00}(x)$, $f_{00\ldots 01}(x)$, ..., $f_{11\ldots 11}(x)$, corresponding to '00 . . . 00', '00 . . . 01', . . . , '11 . . . 11' for the most-significant K bits of the input x, respectively. The use of K MSBs of the input x is a convenient yet arbitrary choice for partitioning the mapping of function ƒ(x). For example, choosing any K bits of the input x will partition the mapping function ƒ(x) into $2^K$ sub-functions. Therefore, with the choice of K MSBs of input x for case detection criterion, the case detector 122 of FIG. 2 examines these K bits and enables the sub-function $f_{b_1 b_2 \ldots b_k}(x)$ corresponding to the K MSBs "$b_1 b_2 \ldots b_k$." Since the sub-function $f_{b_1 b_2 \ldots b_k}(x)$ is specific to the K MSBs "$b_1 b_2 \ldots b_k$," these bits need not even be inputs to $f_{b_1 b_2 \ldots b_k}(x)$. The case-detector may simply pass the least-significant bit (LSB) portion of the input x (e.g., from bit K+1 to bit W, where bit 1 is the MSB and bit W is the LSB of x). The efficiency of sub-functions $f_{b_1 b_2 \ldots b_k}(x)$ is achieved because the sub-functions map a smaller subset of input x to corresponding outputs y. In this example, the omission of the K MSBs from input x contributes to the reduced mapping set for $f_{b_1 b_2 \ldots b_k}(x)$. The outputs of the sub-functions $f_{b_1 b_2 \ldots b_k}(x)$ are provided as inputs to an output selector (e.g., a multiplexer), which routes the results obtained from the sub-function enabled by the case-detector 122 to the output y. In an exemplary digital system designed to minimize power consumption, for example, the sub-function generators are disabled by disabling the toggling activity of their inputs and disabling their corresponding clocks, if any.

Figure 3:
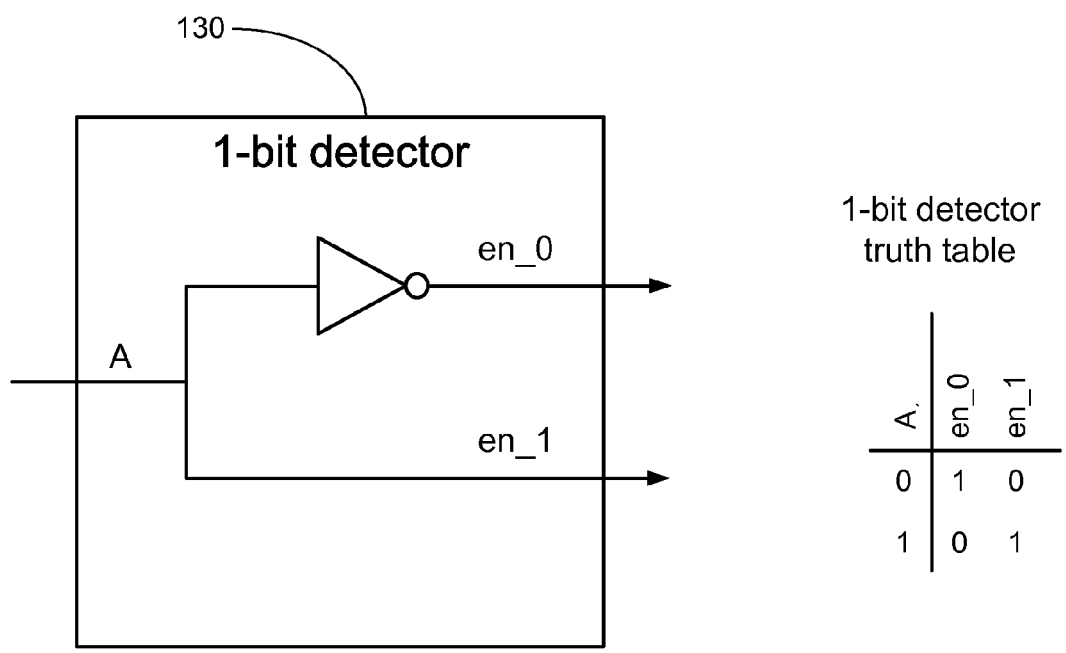
FIG. 3 illustrates an exemplary implementation of a 1-bit detector.

The case-detector 122 for a digital system is advantageously built with detection logic that generates enable signals that are used to enable registers and/or clocks that control the toggling activity of the inputs and clocks of the sub-function generators. For example, FIG. 3 illustrates a simple 1-bit detector 130 that accepts an input A, and that generates two enable signals en_0 and en_1. The enable signal en_0 has a logical value of "1" only when the input A is "0." The enable signal en_1 has a logical value of "1" only when the input A is "1."

Figure 4:
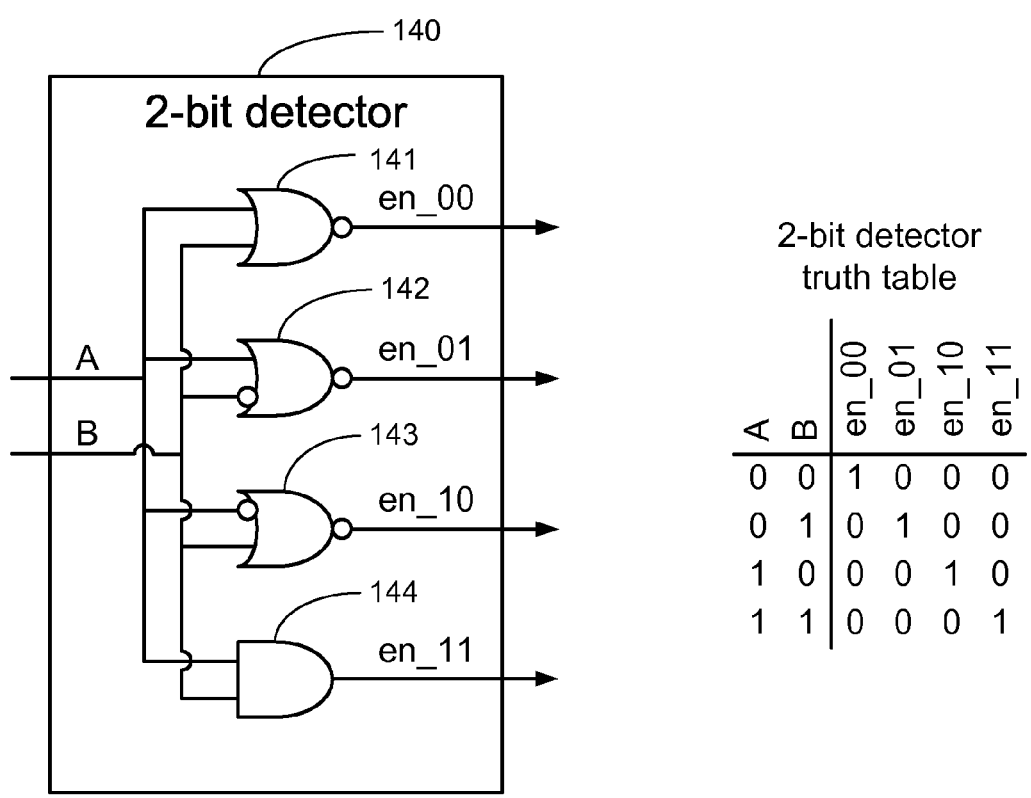
FIG. 4 illustrates an exemplary implementation of a 2-bit detector.

FIG. 4 illustrates an exemplary implementation of a 2-bit detector module 140 that receives two bits (A and B) as inputs to the module. The detector module 140 includes four logic gates 141, 142, 143 and 144 that generate four enable signals (en_00, en_01, en_10, and en_11) in response to the inputs. The en_00 output has a logical value of "1" only when the inputs are A="0" & B="0;" the en_01 output has a logical value of "1" only when the inputs are A="0" & B="1;" the en_10 output has a logical value of "1" only when the inputs are A="1" & B="0;" and en_11 output has a logical value of "1" only when the inputs are A="1" & B="1." The logic truth table in FIG. 4 tabulates the relationships between the inputs and the outputs of the detector 140, which are implemented by the logic gates 141-144.

Figure 5:
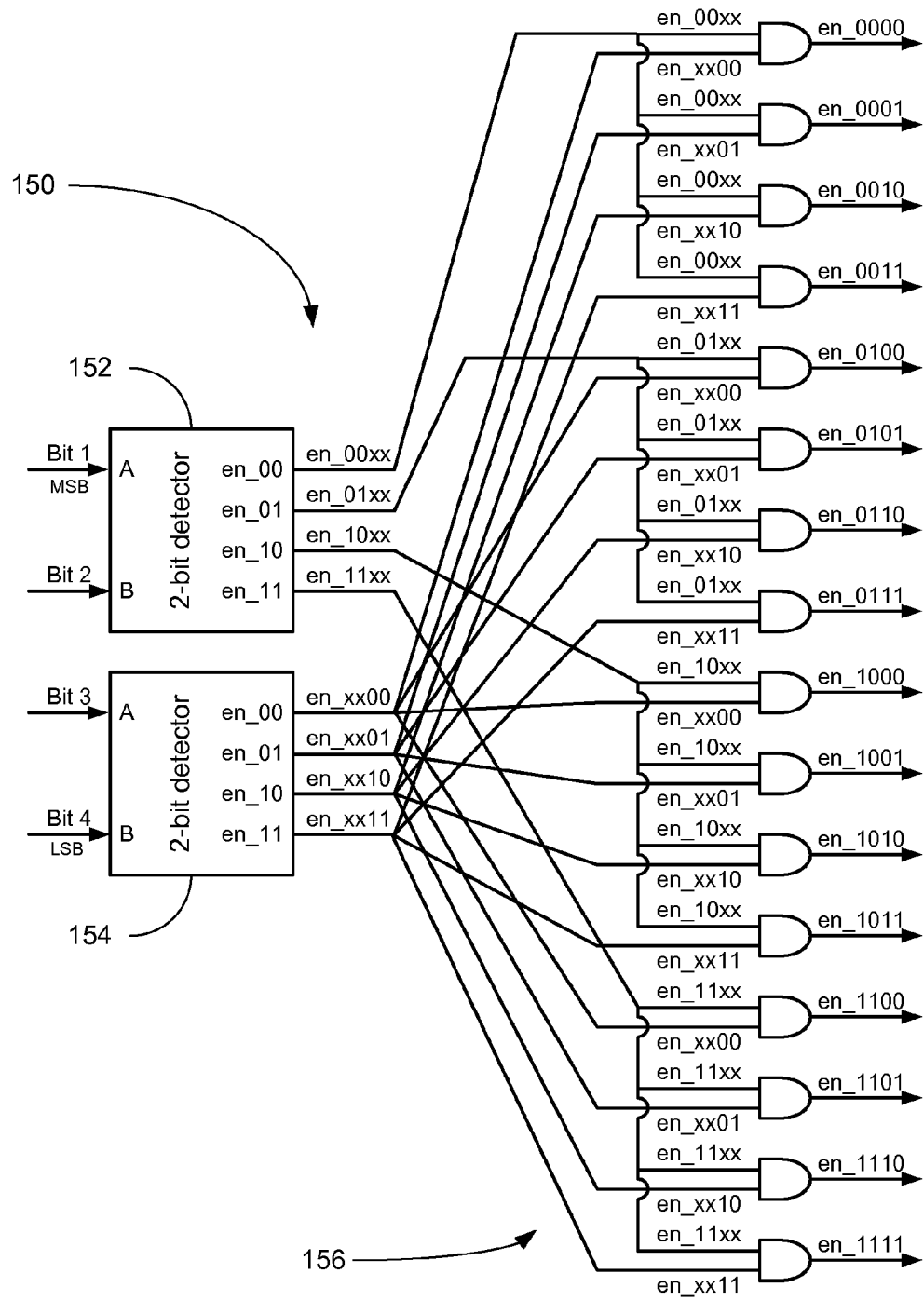
FIG. 5 illustrates an exemplary implementation of a 4-Bit detector using two 2-bit detectors and combining logic.

Multi-bit detectors may be implemented in many different ways. For example, one implementation utilizes multiple smaller-bit detectors and combines the results of the smaller-bit detectors to generate the desired enable signals. FIG. 5 illustrates an example of a 4-bit detector 150 that comprises a first 2-bit detector 152 that generates a first set of four enable signals en_00xx, en_01xx, en_10xx and en_11xx from the two most significant bits (MSBs) of an input value, a second 2-bit detector 154 that generates a second set of four enable signals en_xx00, en_xx01, en_xx10 and en_xx11 from the two least significant bits (LSBs) of the input value, and combining logic (e.g., 16 AND gates) 156 that combines the first and second sets of enable signals to generate sixteen enable signals en_0000, en_0001, en_0010, en_1111.

Figure 6:
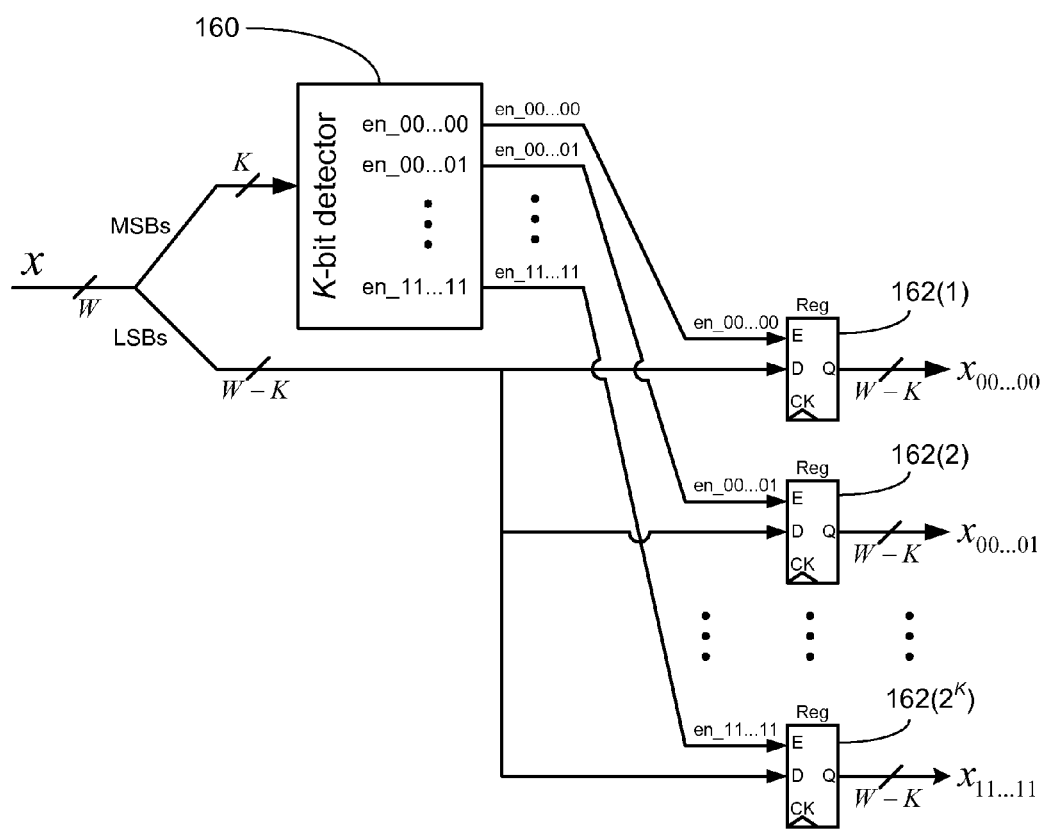
FIG. 6 illustrates an exemplary implementation of a K-Bit case-detector.

FIG. 6 illustrates an example of a case-detector 160 that accepts K bits of a W-bit input x. The case-detector 160 uses the K MSBs of the input x to perform case detection and to generate $2^K$ sets of enable signals (en_00 . . . 00, en_00 . . . 01, en_11 . . . 11). The remaining (W−K) LSBs of the input x are provided as inputs to $2^K$ registers 162(1), 162(2) . . . 162 ($2^K$). Each register generates a corresponding output. The outputs of the $2^K$ registers are provided as inputs to corresponding $2^K$ sub-function generators (not shown in FIG. 6). The registers are controlled by the respective enable inputs to control the toggling activity of the respective output signals. In particular, during any given clock cycle, only the outputs from the one enabled register toggles. For example, when the enable en_00 . . . 00 is active, the output $x_{00\ldots 00}$ of the register 162(1) toggles, and the outputs of the other registers do not toggle. Similarly, when the enable en_00 . . . 01 is active, only the output $x_{00\ldots 01}$ of the register 162(2) toggles.

Figure 7:
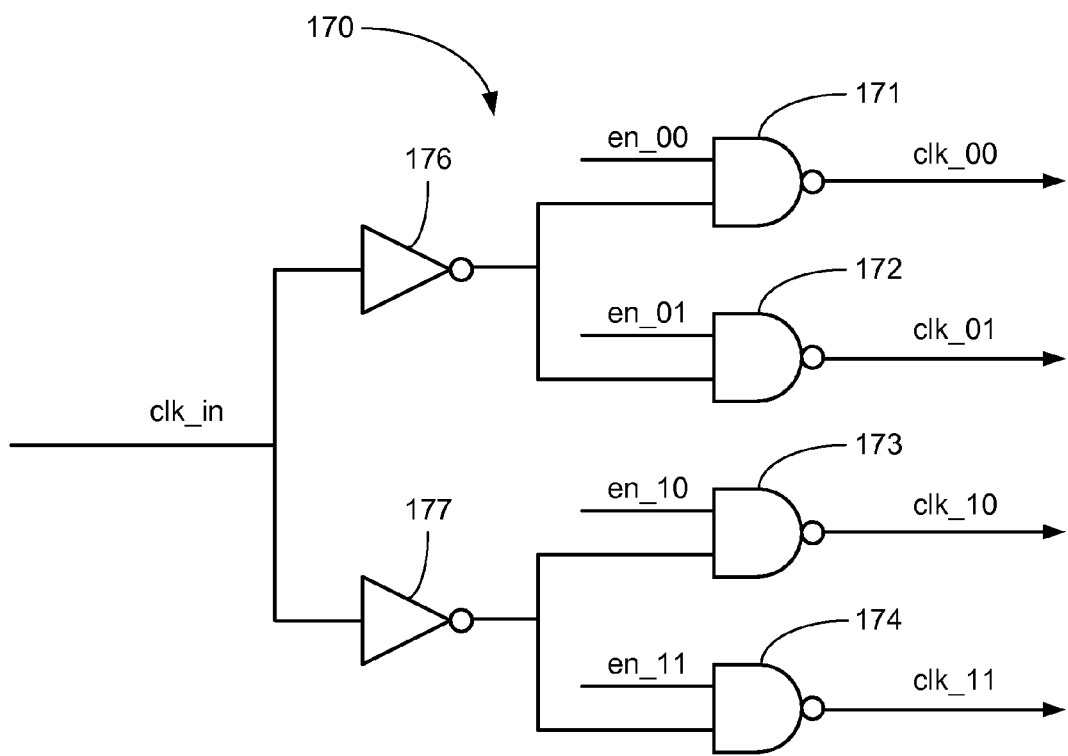
FIG. 7 illustrates an exemplary implementation of a single-enabled-stage clock tree for a 2-bit detection criterion.

In particularly preferred embodiments, the toggling activity of signals in the case-detector are also reduced by utilizing the enable signals to generate a clock tree that activates the clocks only for the registers corresponding to active enables and/or by performing the registering function in multiple stages. FIG. 7 illustrates an exemplary implementation of clock tree 170 for a 2-bit detection criterion using a single enable/disable stage. The clock tree 170 generates four independent clock signals clk_00, clk_01, clk_10, clk_11 in response to a clk_in signal and in response to four enable signals. In the illustrated embodiment, the clock tree 170 includes a first buffer/inverter 176 that buffers and inverts the clock signal applied to the inputs to the first and second NAND gates 171, 172, and includes a second buffer inverter 177 that buffers and inverts the clock signal applied to the inputs of the third and fourth NAND gates 173, 174. In the illustrated embodiment, the clock tree 170 includes four 2-input NAND gates 171, 172, 173 and 174. Each NAND gate receives a buffered/inverted clk_in signal on one input. Each NAND gate receives a unique one of the enable inputs en_00, en_01, en_10, en_11 generated by the case-detector 140 in FIG. 4 on a second input. Each NAND gate provides a respective one of the four clock signals clk_00, clk_01, clk_10, clk_11 on its output. Accordingly, the clock tree 170 activates only one of the four clock signal branches at any time in accordance with which of the four enable inputs en_00, en_01, en_10, en_11 is active during a clock cycle.

Figure 8:
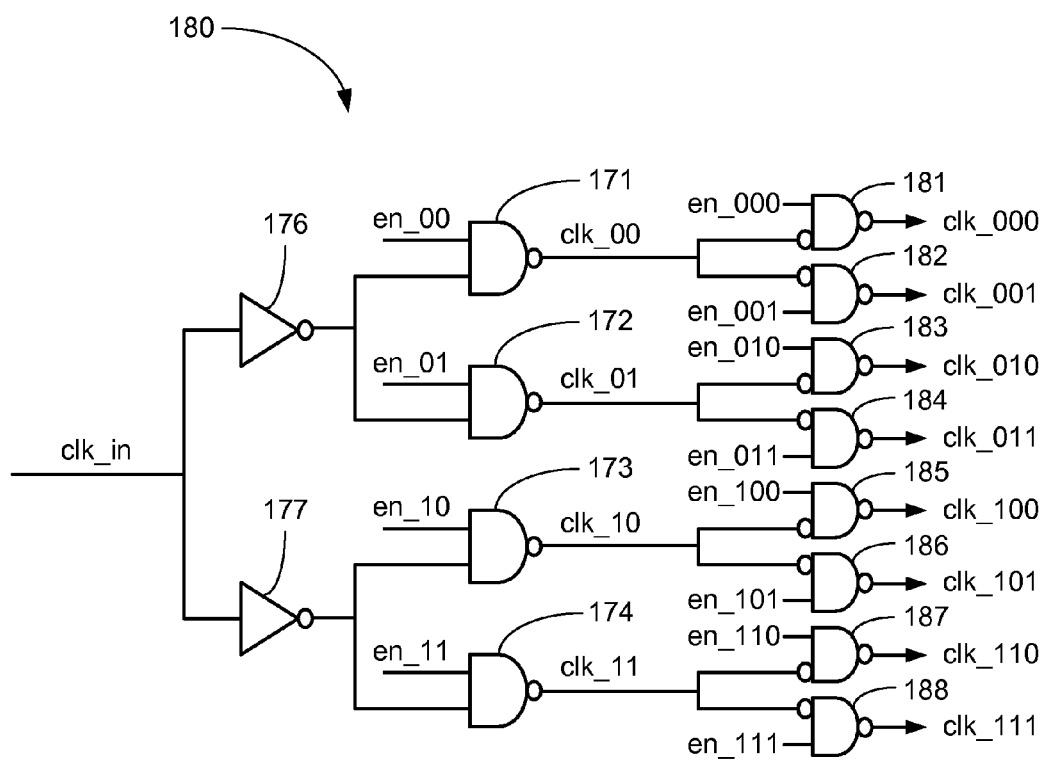
FIG. 8 illustrates an exemplary implementation of a double-enabled-stage clock tree for a 3-bit detection criterion.

The clock tree structure of FIG. 7 is expandable to generate more complex trees and trees with more enable/disable stages. For example, FIG. 8 illustrates a clock tree 180 for a 3-bit detection criterion that utilizes the clock tree 170 of FIG. 7 and that includes additional logic to produce eight independent clock signals. The clock tree 180 couples the four clock signals from the NAND gates 171-173 of the clock tree 170 to the inputs of eight stage-two NAND gates 181, 182, 183, 184, 185, 186, 187 and 188. The NAND gates 181-188 have one active high input, one active low input (represented by the bubble at the input), and an active low output (represented by the bubble at the output). The output of one of the NAND gates 181-188 is active low when the respective active high input receives a logical 1 at the same time that the respective active low input receives a logical 0. Otherwise, the output of the NAND is inactive high. In the illustrated embodiment, each clock signal from the stage-one NAND gates is provided as a respective input to the active low inputs of two of the stage-two NAND gates. The respective active high input of each stage-two NAND gate 181-188 is coupled to a respective one of the eight enable signals en_000, en_001, ... en_111 produced by a 3-bit detector (not shown). The respective active low output of each NAND gate 181-188 is a clock signal clk_000, clk_001, ... clk_111. Only one of the eight enable signals is active during any clock cycle. Accordingly, only a single one of the eight clock signals clk_000, clk_001, ... clk_111 toggles during any clock cycle. The other seven clock signals remain in an inactive high output state during the same clock cycle.

A staged approach similar to the one in the clock tree of FIG. 8 is advantageously utilized to reduce the toggling activity of data signals at the inputs of the registers. For example, the 2-bit enables and 3-bit enables are related such that when either the en_000 signal or the en_001 is active then the en_00 signal is also active, and the en_01, en_10, and en_11 signal are inactive. Accordingly, the relationships between the enable signals are used to enable the data signals in stages.

Figure 9:
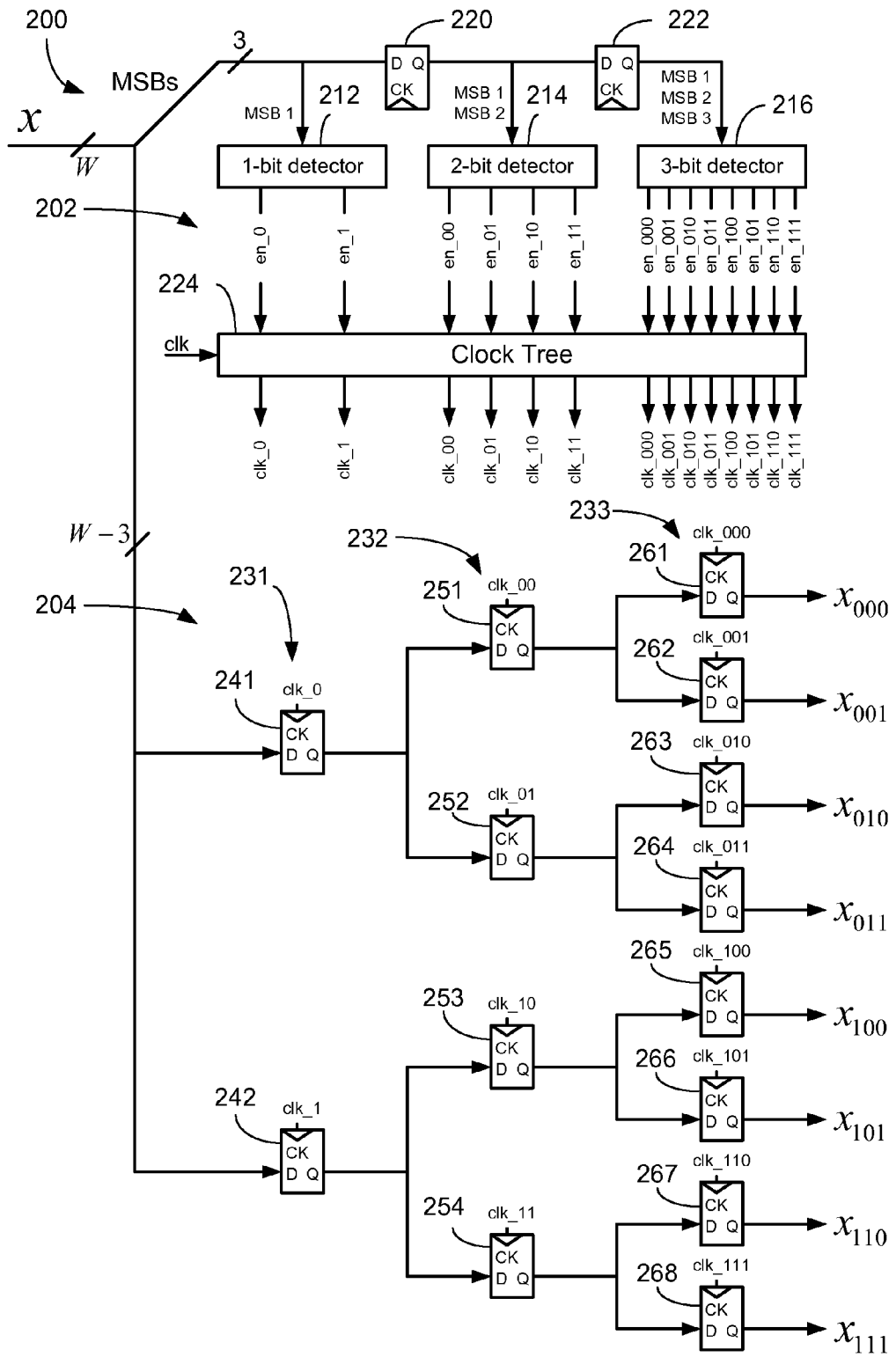
FIG. 9 illustrates an exemplary implementation of a 3-bit case-detector using a staged data registering technique and enabled clock trees to minimize data toggling activity.

FIG. 9 illustrates a 3-bit case detection system 200 that includes an enabled clock generator 202 and a staged (e.g. pipelined) data registering system 204. The system 200 receives an input x comprising W bits. The system 200 generates a plurality (e.g., 8 in the illustrated embodiment) of outputs $x_{000}, x_{001}, \ldots x_{111}$, wherein only a single one of the outputs toggles during any clock cycle. Thus, the 1-bit, 2-bit, and 3-bit detection systems 212, 214, and 216, respectively, in FIG. 9 correspond to the K-bit detector 160 in FIG. 6, with K=1, K=2, and K=3, respectively.

The clock generator 202 in the system 200 comprises a 1-bit detector 212 that receives the most significant bit (MSB1) of the input x and generates two enable signals (en_0 and en_1) in accordance with the 1-bit detector 130 of FIG. 3 (equivalently the K-bit detector 160 in FIG. 6, with K=1). The clock tree 202 further comprises a 2-bit detector 214 that receives the two most significant bits (MSB1, MSB2) and generates four enable signals (en_00, en_01, en_10 and en_11) in accordance with the 2-bit detector 140 of FIG. 4 (equivalently the K-bit detector 160 in FIG. 6, with K=2). A 3-bit detector 216 receives the three most significant bits (MSB1, MSB2, MSB3) and generates eight enable signals (en_000, en_001, en_010, ... en_111) (equivalently the K-bit detector 160 in FIG. 6, with K=3). As described above, each detector activates only one of the respective enable signals during each clock cycle. The clock generator 202 includes a register 220 between the input of the 1-bit detector 212 and the input of the 2-bit detector 214 and includes a register 222 between the input of the 2-bit detector 214 and the 3-bit detector 216. The registers 220 and 222 are clocked by the clk signal. The two registers adjust the propagation delays of the MSBs to the three detectors in the clock generator 202 to correspond to the propagation delays of the LSBs through the pipelined data registering network 204.

The 14 enable signals from the detectors 212, 214, 216 are provided as enable inputs to a clock tree 224. The clock tree 224 is responsive to the 14 enable inputs and to the clk_in signal to produce first, second and third sets of clock signals. In particular, the first set of clock signals comprises clk_0 and clk_1. Only one of the two clock signals is active during a clock cycle in accordance with which one of the en_0 and en_1 signals from the 1-bit detector 212 is active. The second set of clock signals comprises clk_00, clk_01, clk_10 and clk_11. Only one of the four clock signals is active during a clock cycle in accordance with which one of the en_00, en_01, en_10 and en_11 from the 2-bit detector 214 is active. The generation of the second set of clock signals clk_00, clk_01, clk_10, and clk_11 can be accomplished in a single enable/disable stage or two enable/disable stages. In case of two enable/disable stages the clock tree will need to use the en_0 and en_1 signals for the first stage that correspond to the en_00, en_01, en_10, and en_11 signals of the second stage. These en_0 and en_1 signals can be generated by the 2-bit detector 214 or obtained by registering (delaying) the en_0 and en_1 signals generated by the 1-bit detector 212. The third set of clock signals comprises clk_000, clk_001, clk_010, ..., clk_111. Only one of the eight clock signals is active during a clock cycle in accordance with which one of the en_000, en_001, en_010, ..., en_111 signals from the 3-bit detector 216 is active. The generation of the third set of clock signals clk_000, clk_001, ..., clk_111 can be accomplished in one, two, or three enable/disable stage(s). In case of two or three enable/disable stages the clock tree will need to use appropriate en_0 and en_1 signals for the first stage and en_00, en_01, en_10, and en_11 signals for the second stage. These enable/disable signals for the first stage and the second stage can be generated by the 3-bit detector 216 or obtained by registering (delaying) the en_0 and en_1 signals generated by the 1-bit detector 212 and the en_00, en_01, en_10, and en_11 signals generated by the 2-bit detector 214.

The staged data registering network 204 in the system 200 comprises three levels (or stages) of clocked registers identified as a first stage 231, a second stage 232 and a third stage 233. The three stages handle the data in a pipelined manner. In particular, during any clock cycle, the second stage 232 is routing the data routed by the first stage 231 during the immediately preceding clock cycle. Similarly, the third stage 233 routes the same data during the next clock cycle.

The first stage 231 of the data registering network 204 comprises a first stage-one register 241 and a second stage-one register 242. The inputs of the two stage-one registers 241 and 242 advantageously receive the W−3 least significant bits of the input x and output a corresponding W−3 bits of data when clocked. The first stage-one register 241 is clocked by the clk_0 output of the clock tree 224. The second stage-one register 242 is clocked by the clk_1 output of the clock tree 224.

The second stage 232 of the data registering network 204 comprises a first stage-two register 251, a second stage-two register 252, a third stage-two register 253 and a fourth stage-two register 254. The inputs of the first stage-two register 251 and the second stage-two register 252 receive the outputs of the first stage-one register 241. The inputs of the third stage-two register 253 and the fourth stage-two register 254 receive the outputs of the second stage-one register 242. The first stage-two register 251 is clocked by the clk_00 output of the clock tree 224. The second stage-two register 252 is clocked by the clk_01 output of the clock tree 224. The third stage-two register 253 is clocked by the clk_10 output of the clock tree 224. The fourth stage-two register 254 is clocked by the clk_11 output of the clock tree 224.

The third stage 233 of the data registering network 204 comprises a first stage-three register 261, a second stage-three register 262, a third stage-three register 263, a fourth stage-three register 264, a fifth stage-three register 265, a sixth stage-three register 266, a seventh stage-three register 267, and an eighth stage-three register 268. The inputs of the first stage-three register 261 and the second stage-three register 262 receive the outputs of the first stage-two register 251. The inputs of the third stage-three register 263 and the fourth stage-three register 264 receive the outputs of the second stage-two register 252. The inputs of the fifth stage-three register 265 and the sixth stage-three register 266 receive the outputs of the third stage-two register 253. The inputs of the seventh stage-three register 267 and the eighth stage-three register 268 receive the outputs of the fourth stage-two register 254. The outputs of the first through eighth stage-three registers 261-268 comprise W−3 bits each. The outputs are identified as $x_{000}$, $x_{001}$, $x_{010}$, $x_{011}$, $x_{100}$, $x_{101}$, $x_{110}$, and $x_{111}$, respectively. The first stage-three register 261 is clocked by the clk_000 output of the clock tree 224. The second stage-three register 262 is clocked by the clk_001 output of the clock tree 224. The third stage-three register 263 is clocked by the clk_010 output of the clock tree 224. The fourth stage-three register 264 is clocked by the clk_011 output of the clock tree 224. The fifth stage-three register 265 is clocked by the clk_100 output of the clock tree 224. The sixth stage-three register 266 is clocked by the clk_101 output of the clock tree 224. The seventh stage-three register 267 is clocked by the clk_110 output of the clock tree 224. The eighth stage-three register 268 is clocked by the clk_111 output of the clock tree 224.

The registers in the three stages 231, 232, 233 of the data registering network 204 latch data on their respective inputs on the rising edges of their respective clocks. In alternative embodiments, the registers can be responsive to the falling edges of the respective clocks with suitable revisions to the clock generation circuitry. As shown in FIG. 9, during any clock cycle, only 3 out of the 14 data registers will have toggling clock inputs and toggling data outputs and only 6 out of 14 data registers will have toggling data inputs at any given clock cycle.

As an example of the foregoing, when MSB1, MSB2 and MSB3 of the x input are "1," "0" and "1," respectively, during their corresponding clock cycles only three enable signals, en_1, en_10 and en_101, are active, and only three clock signals, clk_1, clk_10 and clk_101, toggle to the active state. Thus, the W−3 least significant data bits of the x input applied to the inputs of the two stage-one registers 241, 242 only propagate to the output of the second stage-one register 242. The data bits on the output of the first stage-one register 241 do not toggle for this value of the three MSBs. Accordingly, only the data bits on the inputs of the third and fourth stage-two registers 253, 254 toggle. Only the data bits on the output of the third stage-two register 253 toggle. Accordingly, only the data bits on the inputs of the fifth and sixth stage-three registers 265, 266 toggle. Only the data bits on the output of the sixth stage-three register 266 toggle.

A similar minimal signal toggling characteristic applies to the clock tree architecture of FIG. 8. In particular, for the example presented above for MSB1, MSB2 and MSB3 having values of "1," "0" and "1," respectively, only the outputs of the third NAND gate 173 and the sixth stage-two NAND gate 186 toggle. Hence, the architecture of the case detector can be made to minimize power consumption using this staging technique. For other minimization parameters (such as area or speed), other techniques appropriate for the specific minimization parameter can be utilized. The number of stages utilized in the design of the clock tree 180 in FIG. 8 or the clock tree 224 in FIG. 9, for the data registering network 204 of FIG. 9, or both, are advantageously selected as a trade-off between chip area and power consumption. For example, the clock tree 180 of FIG. 8 uses two stages of enables. In contrast, the clock tree 224 may use one two or three stages of enables and the data registering network 204 of FIG. 9 uses three stages of enables. For a K-bit binary detection scheme, the number of stages is advantageously selected as any integer between one (no staging) and K (maximum staging).

As illustrated in FIG. 9, the data registering network 204 generates eight outputs $x_{000}$, $x_{001}$, $x_{010}$, $x_{011}$, $x_{100}$, $x_{101}$, $x_{110}$, $x_{111}$ on the outputs of the stage-three registers 261-268; however, during each clock cycle, only one of the eight outputs toggles to represent the W−3 LSBs of the data at the x input three clock cycles earlier. The eight outputs are applied to the inputs of respective sub-function generators, such as, for example, the sub-function generators 124(1), . . . 124(i), . . . 124(N) in FIG. 2, for a configuration where N=8. Although the values provided to the sub-function inputs in the illustrated embodiment herein correspond directly to the W−3 LSBs of the input value x, it should be understood that the value provided to the sub-function inputs can be responsive to the input value x in other ways. For example, the input values may be inverted, may be shifted, may be truncated, or may be otherwise modified before being applied to the inputs of the sub-function generator. The output multiplexer (output selector) 126 is configured to select the active output as the output of the function generator 120. In particular, the output selector 126 routes the result from the appropriate sub-function generator—the one corresponding to the detected case by the case detector—to the output. It is also feasible to design the data registering network such that during each clock cycle more than one of the outputs toggle. In the foregoing example, two outputs instead of one output may toggle at any given clock cycle. This will generate a toggling input to a sub-function generator whose output will not be used and may be sub-optimal to the case with a data registering network producing a single toggling output at any clock cycle.

The implementation of the output selector 126 may comprise a conventional multiplexer (MUX); however, in certain preferred embodiments, the output selector 126 is optimized to perform with maximum efficiency (e.g., minimal power consumption). In particular, an optimized output selector 126 uses signal toggling activity minimization as the optimization parameter for reducing power consumption. Preferably, as described below, the output selector 126 incorporates the staging technique used for the clock tree and the data registering section of the case detector.

Figure 10A:
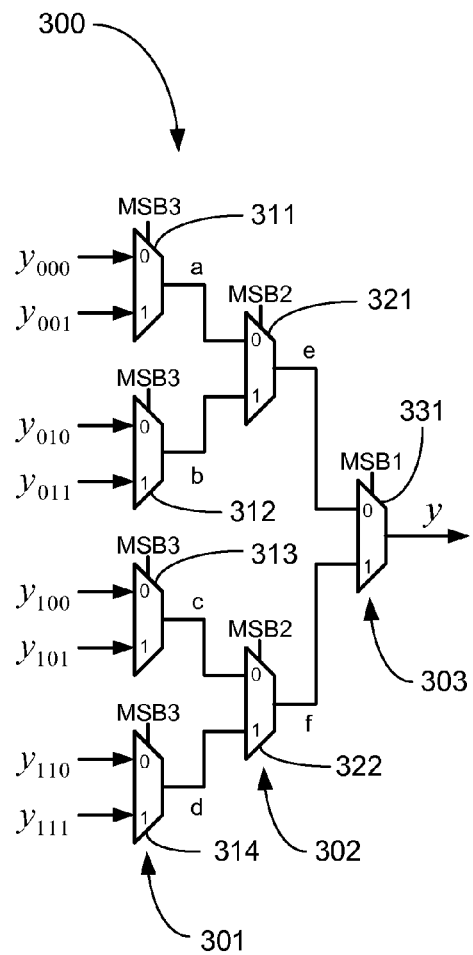
FIG. 10A illustrates an exemplary implementation of an output selector for a 3-bit (8-case) selection criterion using non-enabled "select" signals.

FIG. 10A illustrates an eight-to-one selection architecture 300 using three stages 301, 302, 303 of two-to-one selectors (2:1 MUXes). The first stage 301 comprises a first stage-one multiplexer 311, a second stage-one multiplexer 312, a third stage-one multiplexer 313 and a fourth stage-one multiplexer 314. A first input of the first stage-one multiplexer 311 receives the $y_{000}$ output of a first sub-function generator (not shown in FIG. 10A). A second input of the first stage-one multiplexer 311 receives the $y_{001}$ output of a second sub-function generator (not shown in FIG. 10A). The first stage-one multiplexer 311 produces an output signal "a" that corresponds to the selected input. A first input of the second stage-one multiplexer 312 receives the $y_{010}$ output of a third sub-function generator (not shown in FIG. 10A). A second input of the second stage-one multiplexer 312 receives the $y_{011}$ output of a fourth sub-function generator (not shown in FIG. 10A). The second stage-one multiplexer 312 produces an output signal "b" that corresponds to the selected input. A first input of the third stage-one multiplexer 313 receives the $y_{100}$ output of a fifth sub-function generator (not shown in FIG. 10A). A second input of the third stage-one multiplexer 313 receives the $y_{101}$ output of a sixth sub-function generator (not shown in FIG. 10A). The third stage-one multiplexer 313 produces an output signal "c" that corresponds to the selected input. A first input of the fourth stage-one multiplexer 314 receives the $y_{110}$ output of a seventh sub-function generator (not shown in FIG. 10A). A second input of the fourth stage-one multiplexer 314 receives the $y_{111}$ output of an eighth sub-function generator (not shown in FIG. 10A). The fourth stage-one multiplexer 314 produces an output signal "d" that corresponds to the selected input.

The second stage 302 of the selection architecture 300 comprises a first stage-two multiplexer 321 and a second stage-two multiplexer 322. A first input of the first stage-two multiplexer 321 receives the output of the first stage-one multiplexer 311. A second input of the first stage-two multiplexer 321 receives the output of the second stage-one multiplexer 312. The first stage-two multiplexer 321 produces an output signal "e" that corresponds to the selected input. A first input of the second stage-two multiplexer 322 receives the output of the third stage-one multiplexer 313. A second input of the second stage-two multiplexer 322 receives the output of the fourth stage-one multiplexer 314. The second stage-two multiplexer 322 produces an output signal "f" that corresponds to the selected input.

The third stage 303 of the selection architecture 300 comprises a stage-three multiplexer 331. A first input of the stage-three multiplexer 331 receives the output of the first stage-two multiplexer 321. A second input of the stage-three multiplexer 331 receives the output of the second stage-two multiplexer 322. The stage-three multiplexer 331 produces an output signal y that corresponds to the selected input.

In accordance with the previously described examples, the three most significant bits (MSBs) of the x input are used for case detection for the selection architecture 300. For example, in FIG. 10A, the "select" signals that control the multiplexers are derived directly from the three MSB bits of the x input, which are communicated to the selection architecture 300 from the case detector 200 in FIG. 9. When the MSB1 is "0," the stage-three multiplexer 331 selects the input "e" from the output of the first stage-two multiplexer 321 as the output y. When the MSB1 is "1," the stage-three multiplexer 331 selects the input "f" from the output of the second stage-two multiplexer 322 as the output y. In similar manner, the two stage-two multiplexers 321, 322 are controlled by the MSB2, and the four stage-one multiplexers 311, 312, 313, 314 are controlled by the MSB3.

When the MSB1 is "0" and MSB2 is "0," for example, only the output signals "e" and "a" have any effect on the output y. The signals "f," "d," "c" and "b" have no effect on the output signal. Therefore, the four multiplexers 322, 314, 313 and 312 that generate the four signals do not need to be operational when MSB1 is "0" and MSB2 is "0." For each combination of MSB1 and MSB2 in any clock cycle, only three of the seven multiplexers need to be operational. Since only one of the inputs $y_{00\ldots 00}, \ldots, y_{11\ldots 11}$ toggles due to only one sub-function generator being active, only the "select" signals that control the multiplexers in the path from the active input to the output y need to toggle. By suppressing the toggling of the other select signals, an output selector architecture 350 shown in FIG. 10B is implemented to have minimal toggling activity.

Figure 10B:
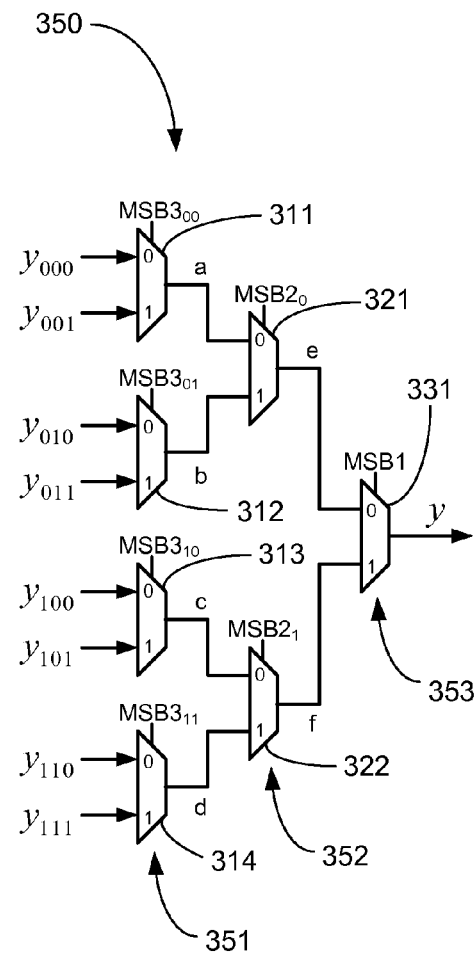
FIG. 10B illustrates an exemplary implementation of an output selector for a 3-bit (8-case) selection criterion using enabled "select" signals.
Figure 10C:
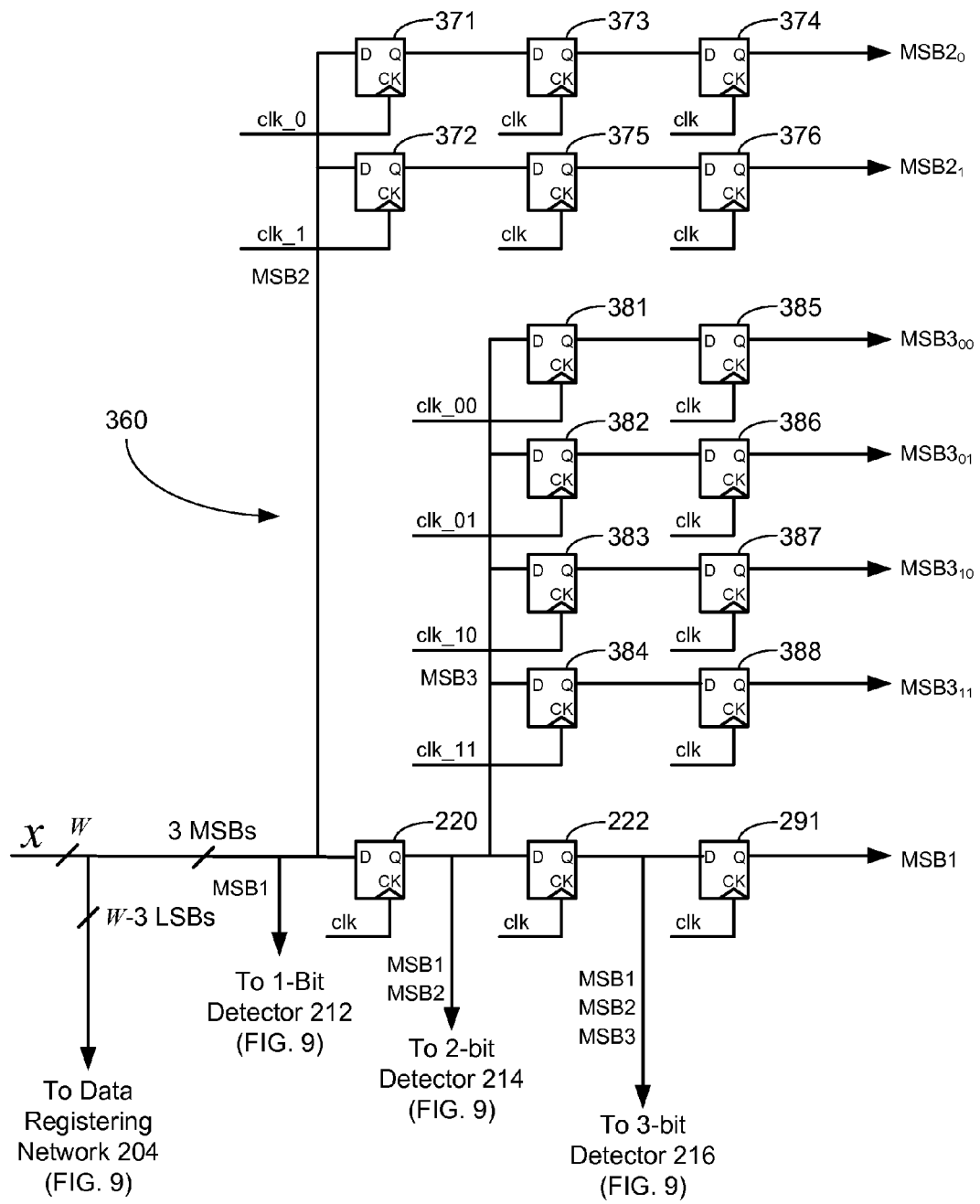
FIG. 10C illustrates an exemplary eight-to-one selection architecture that generates the "select" signals that control the output selector of FIG. 10B.

The output selector 350 in FIG. 10B comprises three stages 351, 352, 353 of multiplexers, which correspond to the three stages 301, 302, 303 in FIG. 10A. The three stages 351, 352, 353 comprise the seven multiplexers described above with respect to FIG. 10A, and the multiplexers are numbered accordingly. The stage-three multiplexer 331, which generates the output y, is always operational and is controlled by MSB1 as in FIG. 10A; however, the four stage-one multiplexers 311, 312, 313, 314 and the two stage-two multiplexers 321 and 322 are not directly controlled by the MSB3 and the MSB2. Rather, the "select" signals that control the six multiplexers are selectively enabled in accordance with the values of the MSB1 and the MSB2. FIG. 10C illustrates a select signal generator 360, which generates the enabled "select" signals using the enable signals en_0, en_1, en_00, en_01, en_10 and en_11, generated from the K-bit detector 202 (FIG. 9) and using the MSBs of the input x. Accordingly, the select signal generator 360 generates $MSB3_{00}$, $MSB3_{01}$, $MSB3_{10}$, and $MSB3_{11}$, which are enabled only when the combination of values of the MSB1 and the MSB2 of the input x correspond to the respective subscripts "00," "01," "10" and "11." Similarly, the select signal generator 360 generates $MSB2_0$, and $MSB2_1$, which are enabled only when the MSB1 of the input x corresponds to the subscripts "0" and "1," respectively.

The select signal generator 360 comprises a first MSB2 register 371 clocked by the ck_0 signal and a second MSB2 register 372 clocked by the ck_1 signal. The first MSB2 register 371 and the second MSB2 register 372 receive the MSB2 at their respective inputs. If the ck_0 signal is active, the first MSB2 register 371 propagates the value of MSB2 to its output during a clock cycle. If the ck_1 signal is active, the second MSB2 register 372 propagates the value of MSB2 to its output during a clock cycle. The output of the first MSB2 register 371 propagates through two additional registers 373 and 374 clocked by the input clk signal. The output of the second additional register 374 is the $MSB2_0$ signal that controls the first stage-two multiplexer 321 in FIG. 10B. The output of the second MSB2 register 372 propagates through two additional registers 375 and 376 clocked by the input clk signal. The output of the second additional register 376 is the $MSB2_1$ signal that controls the second stage-two multiplexer 322 in FIG. 10B. The two additional registers in each path adjust the propagation delays of the $MSB2_0$ and $MSB2_1$ signals to correspond to propagation delays for the other select signals produced by the select signal generator 360.

The select signal generator 360 further comprises a first MSB3 register 381, a second MSB3 register 382, a third MSB3 register 383 and a fourth MSB3 register 384. Each MSB3 register receives the MSB3 at its respective input. The first MSB3 register 381 is clocked by the ck_00 signal and propagates the value of the MSB3 signal to its output when the ck_00 signal is active during a clock cycle. The second MSB3 register 382 is clocked by the ck_01 signal and propagates the value of the MSB3 signal to its output when the ck_01 signal is active during a clock cycle. The third MSB3 register 383 is clocked by the ck_10 signal and propagates the value of the MSB3 signal to its output when the ck_10 signal is active during a clock cycle. The fourth MSB3 register 384 is clocked by the ck_11 signal and propagates the value of the MSB3 signal to its output when the ck_11 signal is active during a clock cycle.

The output of the first MSB3 register 381 propagates through an additional register 385 clocked by the clk signal. The output of the additional register 385 is the $MSB3_{00}$ signal that controls the first stage-one multiplexer 311 in FIG. 10B. The output of the second MSB3 register 382 propagates through an additional register 386 clocked by the clk signal. The output of the additional register 386 is the $MSB3_{01}$ signal that controls the second stage-one multiplexer 312 in FIG. 10B. The output of the third MSB3 register 383 propagates through an additional register 387 clocked by the clk signal. The output of the additional register 387 is the $MSB3_{10}$ signal that controls the third stage-one multiplexer 313 in FIG. 10B. The output of the fourth MSB3 register 384 propagates through an additional register 388 clocked by the clk signal. The output of the additional register 388 is the $MSB3_{11}$ signal that controls the fourth stage-one multiplexer 314 in FIG. 10B. The additional register in each path adjusts the respective propagation delay of each of the $MSB3_{00}$, $MSB3_{01}$, $MSB3_{10}$ and $MSB3_{11}$ signals to correspond to propagation delays for the other select signals produced by the select signal generator 360.

The MSB1 signal applied to the select input of the stage-three multiplexer 331 in FIG. 10B is generated as the output of a register 291. The register 291 receives the MSB1 signal from the output of the register 222 and is clocked by the clk signal. As illustrated, the propagation delay from the input x to the MSB1 output of the register 291 is substantially the same as the propagation delay from the input x to each of the other select signals produced by the select signal generator 360. Also note that the output selector 350 can be pipelined by inserting registers between the multiplexers. In a pipelined output selector architecture, the select inputs of the multiplexers also need to be pipelined to be properly aligned with the data inputs of the multiplexers.

Figure 11A:
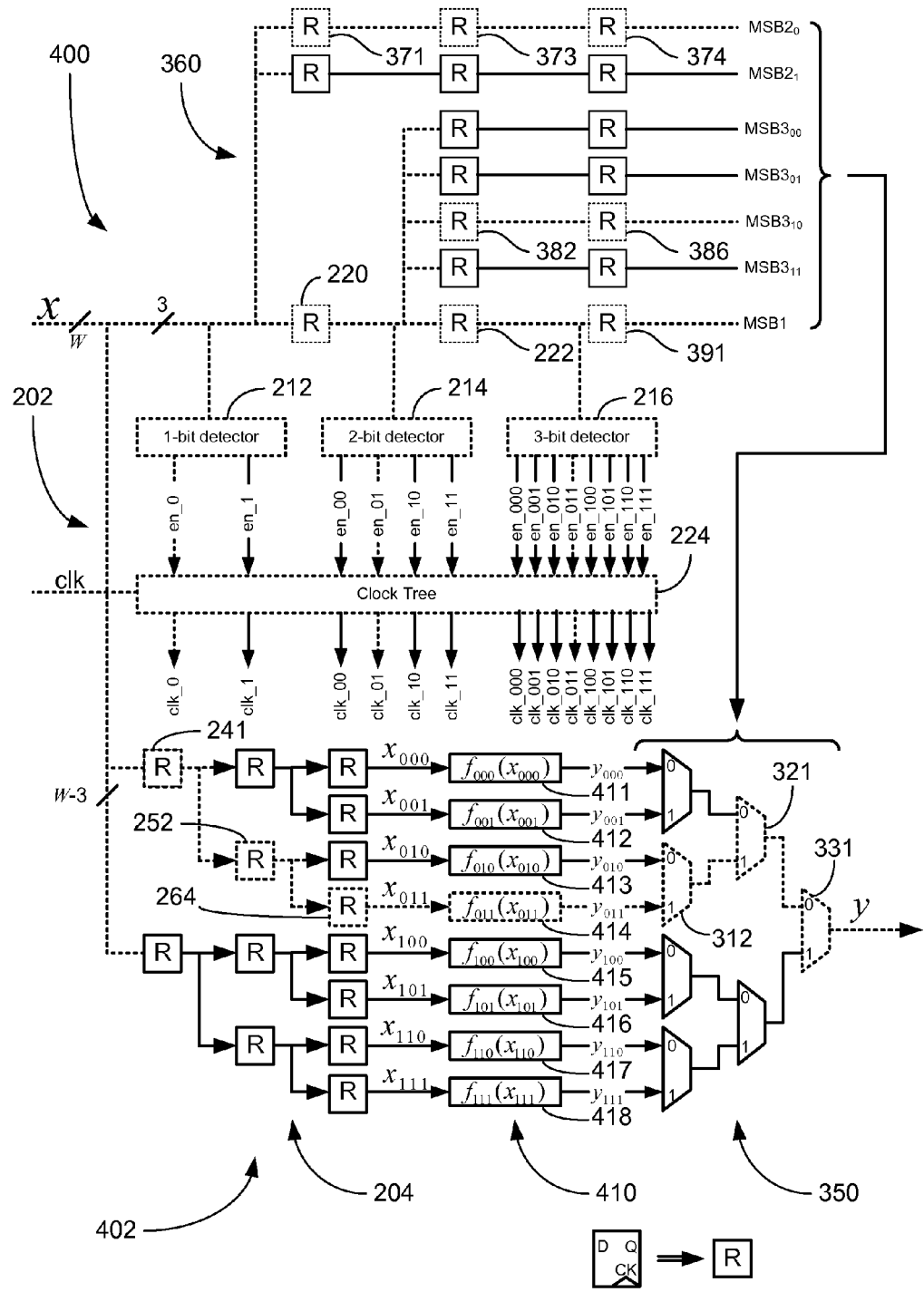
FIG. 11A illustrates a complete system incorporating a 3-bit case detector, which includes an output selector, a select signal generator, a clock generator, and a data registering network in combination with a plurality of sub-function blocks.

FIG. 11A illustrates a complete system 400 that includes the output selector 350 and the select signal generator 360 described above as part of a 3-bit case detector 402. The 3-bit case detector 402 further includes the clock generator 202 and the data registering network 204, which are described in detail above. As indicated in the inset portion of the drawing, the registers in FIG. 11A (and in FIGS. 14, 16 and 21 described below) are represented with a small box identified with an "R" in order to reduce the drawing area. The system 400 further includes a sub-function block 410, which comprises a plurality (e.g., eight) of sub-function blocks. A first sub-function block 411 performs a function $f_{000}$ when the most significant bits of the x input have values of "000." A second sub-function block 412 performs a function $f_{001}$ when the most significant bits of the x input have values of "001." A third sub-function block 413 performs a function $f_{010}$ when the most significant bits of the x input have values of "010." A fourth sub-function 414 block performs a function $f_{110}$ when the most significant bits of the x input have values of "011." A fifth sub-function block 415 performs a function $f_{100}$ when the most significant bits of the x input have values of "100." A sixth sub-function block 416 performs a function $f_{101}$ when the most significant bits of the x input have values of "101." A seventh sub-function block 417 performs a function $f_{110}$ when the most significant bits of the x input have values of "110." An eighth sub-function block 418 performs a function $f_{111}$ when the most significant bits of the x input have values of "111."

In FIG. 11A, the blocks that toggle for the case of the input x having MSB bits with a value of "011" are highlighted with dashed lines. In particular, in the select signal generator 360, only data at the registers 371, 373, 374, 382 and 386 toggle; in the data registering network 204, only the registers 241, 252 and 264 toggle; in the sub-functions block 410, only the $f_{011}$ sub-function block 414 is active; and in the output select 350, only the multiplexers 312, 321 and 331 are active. It should be understood that the dashed lines represent the path of a single data input as it propagates through the three stages of the data registering network 204 in three sequential clock cycles. During any particular clock cycle, the three stages of the data registering network 204 are handling three independent data inputs in a pipelined manner.

Figure 11B:
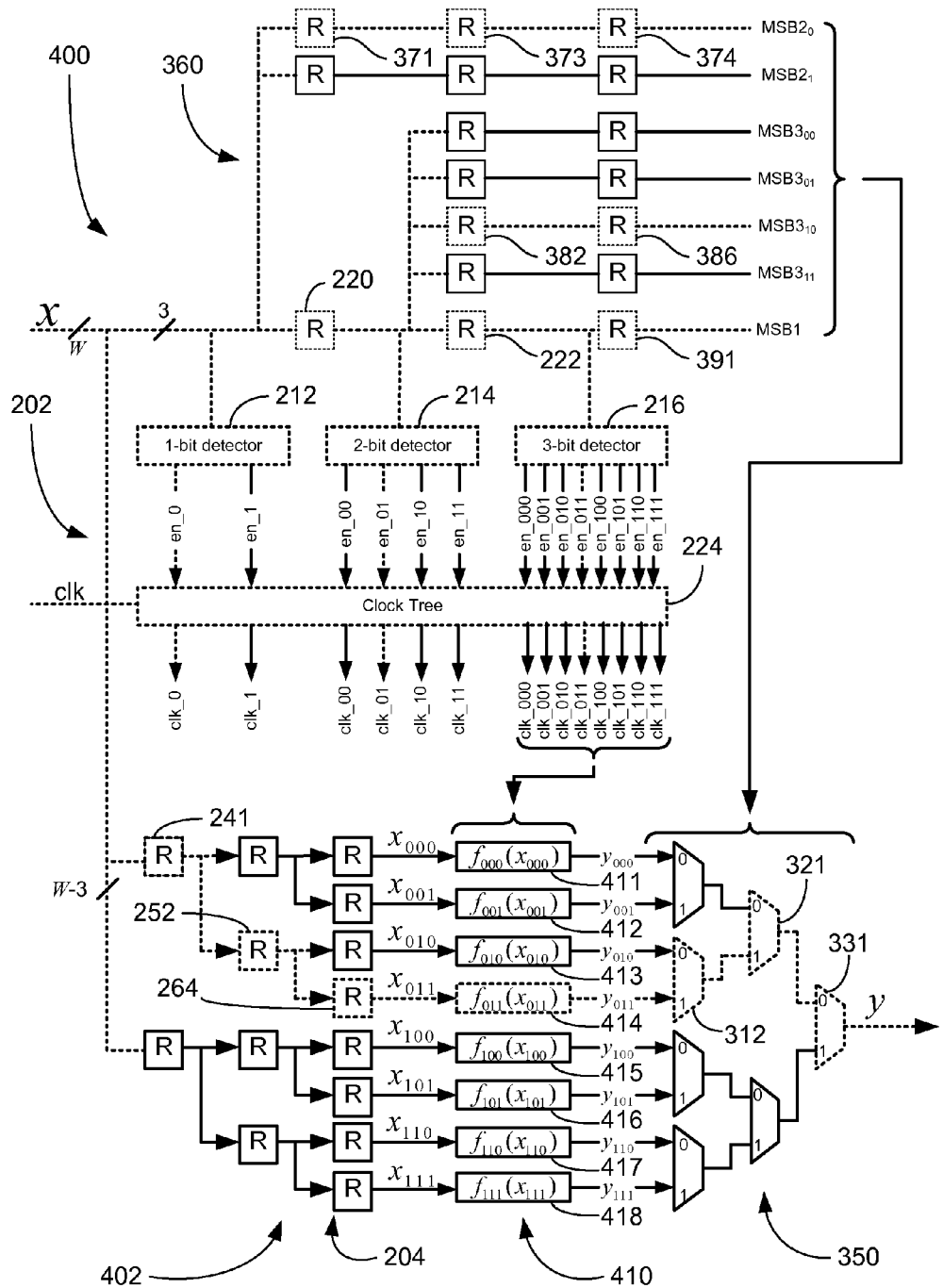
FIG. 11B illustrates a system corresponding to the system in FIG. 11A, wherein the sub-function blocks receive clock signals responsive to the detected case.

FIG. 11B illustrates a modification of the embodiment of FIG. 11A, wherein the sub-function blocks include internal clocked logic and receive clock signals responsive to the detected case. In particular, the $f_{000}$ sub-function block 411 is clocked by the clk_000, the $f_{001}$ sub-function block 412 is clocked by the clk_001, and so on.

As discussed above with respect to FIG. 9, the number of enabled select stages in the clock tree 202 and the data-registering network 204 can be varied as a trade-off between lower power consumption and smaller integrated circuit size. Furthermore, the implementation of the output selector is not limited to the use of 2:1 multiplexers. For example, FIG. 14 (described in more detail below) includes an implementation of a 64-to-1 output selector 506 which incorporates twenty-one 4:1 multiplexers.

The method of case detection and output selection has many applications. One such application is an implementation of a direct digital synthesizer (DDS) (also commonly referred to as direct digital frequency synthesizer (DDFS)). The described method of case detection and output selection offers many advantages for practical systems utilizing the DDS functional blocks, including, for example, low power consumption, an ability to efficiently share resources among multiple units to achieve high data rates with minimal power consumption, and programmability to maximize performance.

Figure 12:
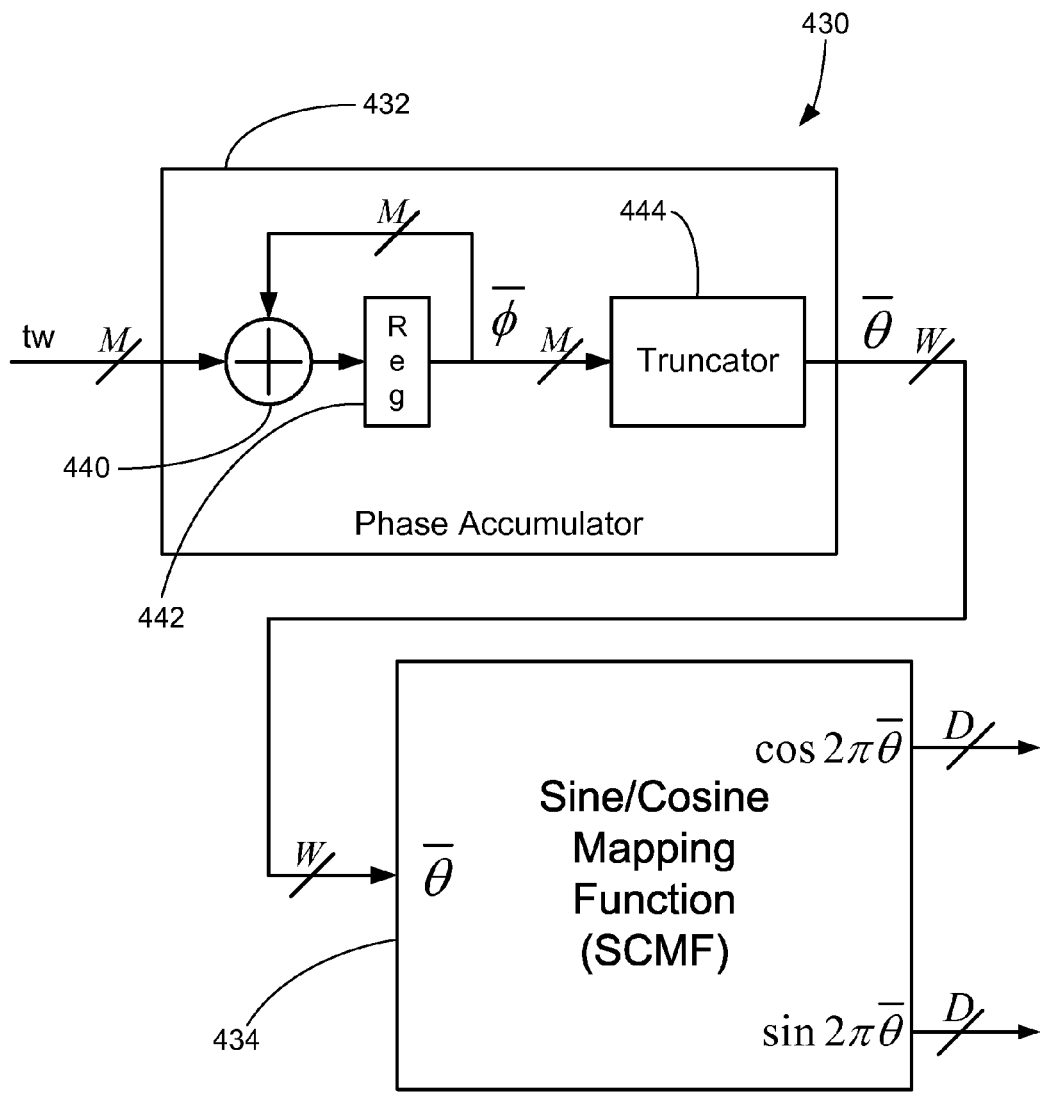
FIG. 12 illustrates a general structure of a direct digital synthesizer (DDS)

An exemplary DDS 430 is illustrated in FIG. 12. The DDS 400 comprises a phase accumulator 432 and a sine/cosine mapping function (SCMF) block 434. The phase accumulator 432 receives an input tuning word (tw) and generates a sequence of samples representing phase angles. The mapping function block 434 receives the sequence of samples representing the phase angles and generates samples corresponding to the corresponding sine values and/or cosine values of the phase angles. See, for example, J. Tierney, C. M. Rader, and B. Gold, "A Digital Frequency Synthesizer," *IEEE Trans. Audio Electroacoustics*, Vol. AU-19, pp. 48-57, March 1971, for more information regarding the basic techniques of digital frequency synthesis.

As stated above, the phase accumulator 432 receives a normalized tuning word (tw) as an input and generates a normalized truncated phase angle θ as an output. The tuning word is accumulated though an overflowing adder 440 and a feedback register 442 to generate a normalized phase angle $\bar{\phi}$. Assuming the output of the phase accumulator feedback register 442 to be zero at an initial time instance n=0, and assuming the input tw represents a binary positive fractional number, then the relationship between the input tw and the phase angle $\bar{\phi}$ is $$\bar{\phi} = (n \times tw)_{mod_{1,0}},$$

for a value of tw that remains unchanged for the time period between zero and n. The normalized phase angle $\bar{\phi}$ represents the radian angle $\phi=2\pi\bar{\phi}$. The normalization is selected so that fractional values of $\bar{\phi}$ between 0 and 1.0 represent values of $\phi$ between 0 and $2\pi$.

In the illustrated embodiment of FIG. 12, the phase accumulator output $\bar{\theta}$ is obtained from $\bar{\phi}$ via a truncation operation in a truncator 444 (e.g., by retaining W of the most significant bits out of M total bits representing the phase angle $\bar{\phi}$). Using a binary positive fractional representation for $\bar{\theta}$ as well, the relationship between $\bar{\theta}$ and $\bar{\phi}$ via the truncation operation can be expressed as $$\bar{\theta} = \frac{\lfloor 2^W \bar{\phi} \rfloor}{2^W}.$$

In the foregoing expression, the "floor function" notation $\lfloor x \rfloor$ denotes the largest integer not greater than x (e.g., $\lfloor -2.125 \rfloor = -3.00$). Therefore, $\bar{\theta}$ represents the radian angle, where $$\theta = 2\pi\bar{\theta} = 2\pi\frac{\lfloor 2^W n \times tw \rfloor}{2^W} \approx 2\pi n \times tw.$$

The SCMF block 434 receives the normalized radian angle $\bar{\theta}$ from the truncator 444 and generates the sine and/or the cosine of the corresponding angle $\theta$. Therefore the SCMF block 434 performs the mapping $c=\cos 2\pi\bar{\theta}$ and/or the mapping $s=\sin 2\pi\bar{\theta}$. The two mapping functions can be written as functions $c=f_c(\bar{\theta})$ and $s=f_s(\bar{\theta})$. Also note that in embodiments where the number of bits M for the tuning word is less than or equal to the number of bits W for $\bar{\theta}$, the truncator in the phase accumulator reduces to a simple pass-through and may be completely eliminated from the phase accumulator. The SCMF block 434 can be viewed as a function generator for each of its outputs and can be implemented using the above-described method of case detection and output selection.

The range of angles to be mapped to their corresponding sine values and/or cosine values can be easily reduced from $(0, 2\pi)$ to $(0, \pi/2)$ or to $(0, \pi/4)$ via a phase mapping operation on $\bar{\theta}$ and conditional interchange and/or negate operations on the outputs. This phase angle range reduction is well known and described in A. Torosyan, "Direct Digital Frequency Synthesizers: Complete Analysis and Design Guidelines," Ph. D. Dissertation, University of California, Los Angeles, 2003. Both the phase mapping operation and the interchange and/or negate operations can be efficiently implemented. The overhead associated with performing these operations is worth the reduction of the mapping angle space from $(0, 2\pi)$ to $(0, \pi/2)$ or to $(0, \pi/4)$ (e.g., by a factor of 4 or by a factor of 8). Considering $\bar{\omega}$ to be the (W−3)-bit normalized angle representing $\omega$ in the range $(0, \pi/4)$ and obtained from $\bar{\theta}$ via the phase mapper, the SCMF outputs $\cos 2\pi\bar{\theta}$ and/or $\sin 2\pi\bar{\theta}$ are readily obtained from $$\cos\frac{\pi}{4}\bar{\omega}$$

and $$\sin\frac{\pi}{4}\bar{\omega}$$

values via a conditional interchange operation and/or a negate operation. The condition of the interchange operation and/or negate operation depends on the 3 most significant bits of the phase angle $\bar{\theta}$. If $\bar{\omega}$ is also considered a binary positive fractional number, the phase mapper performs an efficient mapping from $\bar{\omega}$ to:

$$c = \cos\frac{\pi}{4}\bar{\omega} \qquad (2)$$
$$s = \sin\frac{\pi}{4}\bar{\omega}$$

The phase mapper produces the outputs with D-bit precision.

Figure 13:
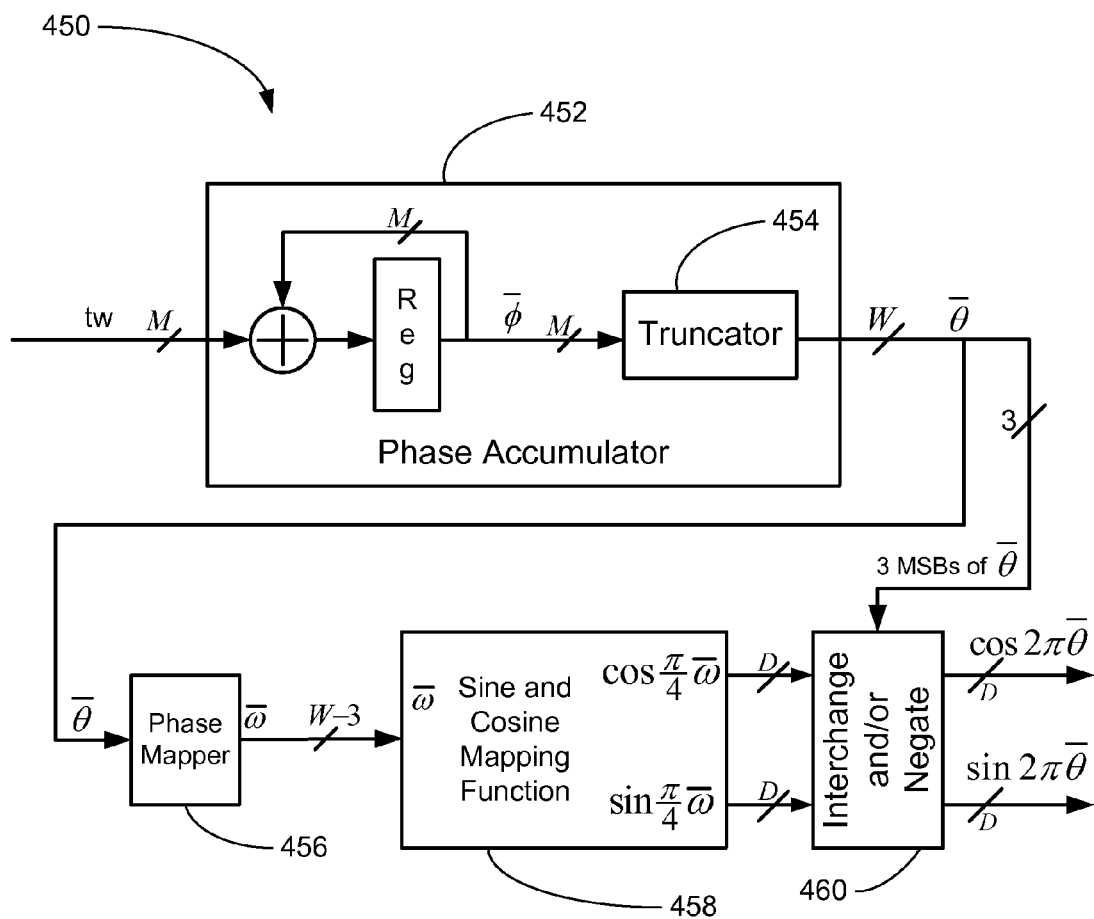
FIG. 13 illustrates an implementation of a DDS using a phase mapper to generate an angle $\bar{\omega}$, a sine and cosine mapping function (SCMF) for $\bar{\omega}$, and an interchange and/or negate reconstruction block.

FIG. 13 illustrates a DDS 450, which is implemented with a phase accumulator 452 and a truncator 454 (corresponding to the phase accumulator and truncator of FIG. 12), a phase mapper 456, a sine and cosine mapping function (SCMF) block 458, and an output interchange and/or negate function block 460. The block 460 operates as an output reconstruction block responsive to the most significant bits of the digital value representing the unmapped phase angle to reconstruct at least one of the sine and the cosine of the unmapped phase angle from the mapping function output in accordance with the mapped angular range. Again note that in embodiments where the number of bits M for the tuning word is less than or equal to the number of bits W for $\bar{\theta}$, the truncator in the phase accumulator reduces to a simple pass-through and may be completely eliminated from the phase accumulator.

The implementation of the SCMF block 458 for $\bar{\omega}$ is the most challenging and resource-consuming block in FIG. 13. Since the SCMF block 458 performs a mapping from an input $\bar{\omega}$ to one or both of the outputs $$\cos\frac{\pi}{4}\bar{\omega}$$

and $$\sin\frac{\pi}{4}\bar{\omega},$$

the above-described method of case detection and output selection can be utilized for an efficient implementation of this SCMF block 458. An exemplary implementation of the SCMF block 458 to minimize signal "toggling" activity (e.g., to minimize power consumption) is illustrated below.

When the most significant bit (MSB) of $\bar{\omega}$ in Equation (2) is "0," $\bar{\omega}$ represents an angle in the range $(0, \pi/8)$. When the most significant bit (MSB) of $\bar{\omega}$ in Equation (2) is "1," $\bar{\omega}$ represents an angle in the range, $(\pi/8, \pi/4)$. The exact angle represented by $\bar{\omega}$ for each case is determined by the remaining least significant bits (LSBs) of $\bar{\omega}$. Similarly, when the two most significant bits (MSBs) of $\bar{\omega}$ are '00', '01', '10', and '11', the remaining least significant bits of $\bar{\omega}$ represent angles in the following respective ranges:

$$\left(\frac{0\pi}{16}, \frac{1\pi}{16}\right), \left(\frac{1\pi}{16}, \frac{2\pi}{16}\right), \left(\frac{2\pi}{16}, \frac{3\pi}{16}\right), \text{ and } \left(\frac{3\pi}{16}, \frac{4\pi}{16}\right).$$

Unreduced fractions are used in the representation of the ranges to highlight that the spans of the ranges are equal. Therefore, using K most significant bits of $\bar{\omega}$ for case detection, the remaining (W−3−K) most significant bits of $\overline{\omega}$ represent angles in $2^K$ equal angle ranges:

$$\left(\frac{0}{2^K}\frac{\pi}{4}, \frac{1}{2^K}\frac{\pi}{4}\right), \ldots, \left(\frac{2^K-1}{2^K}\frac{\pi}{4}, \frac{2^K}{2^K}\frac{\pi}{4}\right).$$

Hence, each of $2^K$ sub-function generators is implemented to perform a mapping of Equation (2) specifically for one of the corresponding angle ranges. The implementation of the SCMF block 458 using the method of case detection and output selection is advantageously accomplished in certain embodiments by constructing each sub-function generator $f_i(\overline{\omega_{LSB}})$ m as a lookup table (e.g., a Read Only Memory (ROM) module).

For a DDS 450 with a 32-bit input tw and a 14-bit output resolution, a spurious-free dynamic range (SFDR) of 92 dBc (decibels relative to a carrier) can be achieved with a phase truncation of W=16. SFDR along with signal-to-noise ratio (SNR) are commonly used metrics for DDS performance specification. (See, for example, A. Torosyan, "Direct Digital Frequency Synthesizers: Complete Analysis and Design Guidelines," Ph. D. Dissertation, University of California, Los Angeles, 2003.) For a DDS with such specifications, $\overline{\omega}$ would require 13 bits (e.g., W−3 bits with W=16). When K=6 most significant bits of $\overline{\omega}$ are chosen for case detection, $2^K$=64 sub-function generators are required, and each sub-function generator receives 7 bits (e.g., W−3−K=7 with W=16 and K=6).

Figure 14:
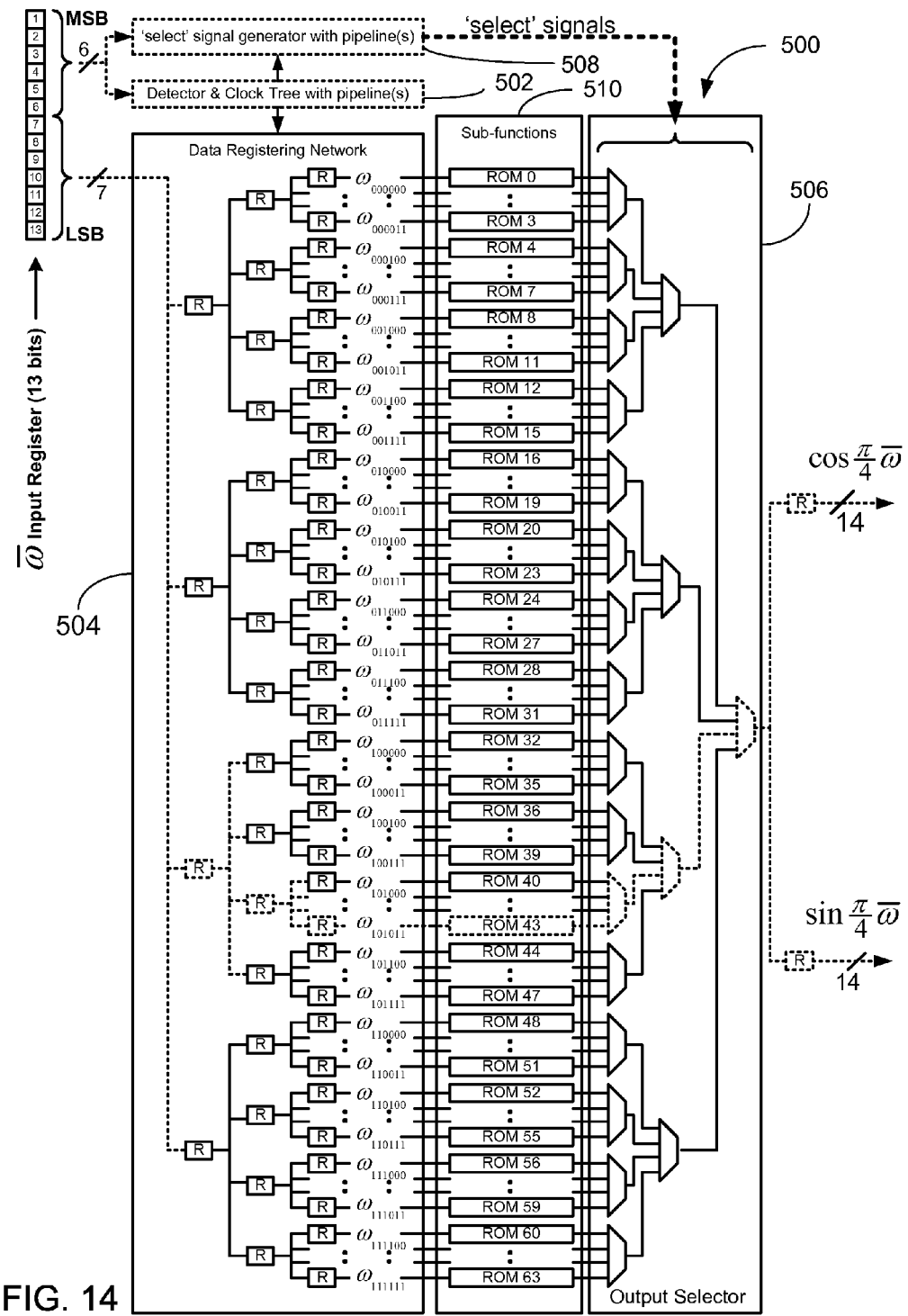
FIG. 14 illustrates an implementation of a DDS incorporating SCMF and using the case detection and output selection method to minimize signal toggling activity.

FIG. 14 illustrates an implementation of an SCMF 500 in a DDS using the above-described case detection and output selection method. This corresponds to the SCMF 458 in FIG. 13. The architecture of the SCMF 500 uses 4-case detectors (e.g., each successive detection stage uses 2 additional bits from the input for case determination) and 4-to-1 multiplexers for output selection. Therefore, the 6-bit case detection operation performed by a detector 502, the data registering function performed by a data registering network 504, and the output selection function performed in an output selector 506 in response to a select signal generator 508 are advantageously performed in 3 stages. The first stage of each function considers the 2 most significant bits of the input, while the second stage considers the 4 most significant bits of the input, and the third stage considers the 6 most significant bits used for case detection. As discussed above, only one path through the data registering network 504, one of the sub-functions in a sub-functions block 510, and the output selector 506 is active (e.g., has data that is toggling) during each corresponding clock cycle. For example, FIG. 14 includes dashed lines to highlight the modules which will toggle on their corresponding clock cycles for the case where $\overline{\omega_{MSB}}$="101011." Again, it should be understood that the dashed lines in the data registering network 504 represent the path traveled by the data through the three stages during three consecutive clock cycles.

As illustrated in FIG. 14, during any clock cycle only 3 out of 84 registers in the data registering network are toggling the data. Each register is a 7-bit register. Accordingly, only 21 single-bit registers out of 588 single-bit registers are toggling the data. Similarly, the 64 inputs to the sub-functions block 510 are 7 bits each. During any clock cycle, only 7 bits are toggling out of the total of 448 bits. Similar behavior is obtained at the outputs of the sub-functions block 510. If the outputs of the sub-functions are 28 bits (e.g., 14 bits for the cosine and 14 bits for the sine), then during any clock cycle, only 28 bits are toggling out of the total of 1,792 bits. The sub-functions block 510 in FIG. 14 is implemented using 64 ROMs; however, only one of the 64 ROMs is active during any clock cycle. The output selector block 506 comprises 21 4-to-1 multiplexers. Only 3 out of the 21 multiplexers are active during any clock cycle. Therefore, the case detection and output selection technique for the implementation of the DDS in FIG. 14 reduces signal toggling activity and yields an implementation with significantly reduced power consumption.

In the embodiment of FIG. 14, the inputs to all ROMs comprise 7 bits. Hence, each ROM has 128 addressed entries. For each entry, each ROM generates 14 bits for the sine and 14 bits for the cosine. Although it may appear that each ROM comprises 3,584 bits (128 locations by 28 bits per location), the most significant bits are used for case detection so that each ROM is configured to span a limited range of phase angles for which the mapping function needs to be performed. Therefore, a significant number of the most significant bits of the ROM output will be constants throughout the ROM addressing range and these bits need not be generated for each address location. This property is a good example why sub-function generation is much more efficient than the generation of the overall function with a common approach for the entire range of the input phase angles. Table 1 (located at the end of the detailed description) tabulates an exemplary set of 14-bit cosine values and 14-bit sine values for the ROM 43 (e.g., the active ROM in FIG. 14 for the case where $\overline{\omega_{MSB}}$="101011"). Table 1 shows that the 6 most significant bits of the cosine values and the 7 most significant bits of the sine values are constant throughout the ROM 43 for the range of angles spanned by the ROM 43. Accordingly, these 13 bits need not be stored or generated. Rather, in preferred embodiments, the 13 bits are hard wired to their appropriate constant values. For the ROM 43, with the contents of Table 1, the number of stored or generated bits for each entry is reduced from 28 bits down to 15 bits—a reduction of greater than 46%.

The implementation of the sub-function generators is not limited or bound to any specific method. In fact, since the sub-function generators correspond to different input cases and perform the mapping over a specific limited input range, the most appropriate (e.g., most efficient) method for that case should be utilized.

The DDS implementation described above is straight forward, and the focal point of the implementation is the application of the case detection and output selection method on a single large-order mapping function that contains all of the samples of the sine/cosine function. Before the application of the case detection and output selection method, the sine and cosine mapping function block 458 in FIG. 13 could have been considered to be a single large ROM. For example, methods are described in the literature where the sine and cosine mapping function block 458 in FIG. 13 is implemented using two or more ROMs with some additional circuitry to recombine the results obtained from the multiple ROMs. (See, for example, D. A. Sunderland, R. A. Strauch, S. S. Wharfield, H. T. Peterson, and C. R. Cole, "CMOS/SOS Frequency Synthesizer LSI Circuit for Spread Spectrum Communications," *IEEE Journal of Solid-State Circuits*, Vol. SC-19, pp. 497-506, August 1984; and H. T. Nicholas, III, and H. Samueli, "A 150-MHz Direct Digital Frequency Synthesizer in 1.25-μm CMOS with −90-dBc Spurious Performance," *IEEE Journal of Solid-State Circuits*, Vol. 26, pp. 1959-1969, December 1991.) One key advantage of the cases described in the literature is that each one of the multiple ROMs is significantly smaller in size (e.g., has a much smaller number of entries) when compared to the single large ROM of the alternative approach. In fact, total complexity of all ROMs and the additional circuitry associated with combining the ROM outputs may be less than the complexity of the single large ROM.

Figure 15:
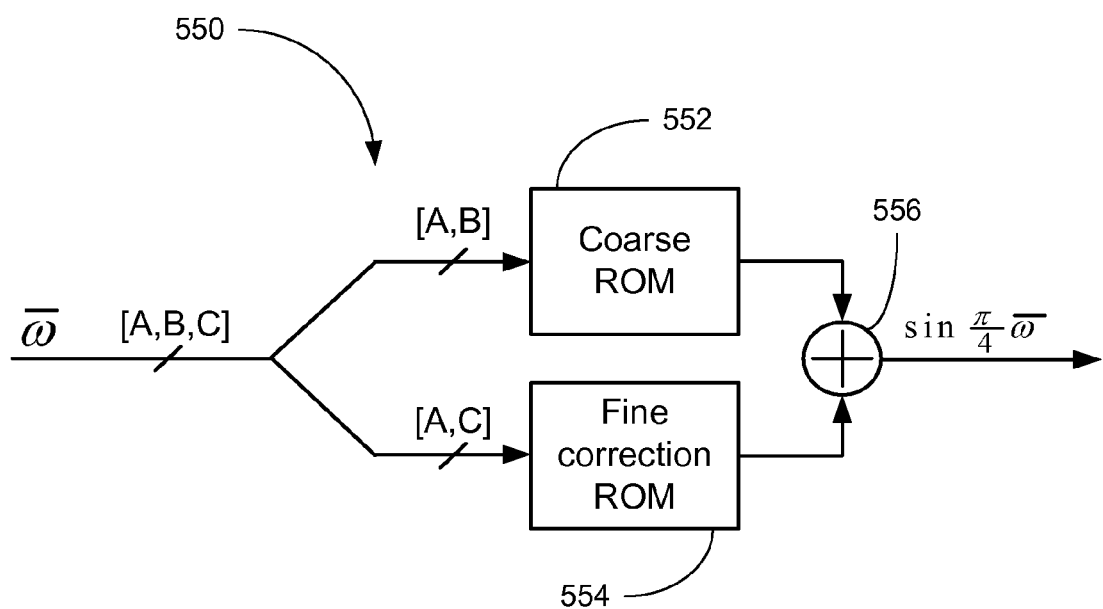
FIG. 15 illustrates a block diagram of Sunderland's ROM compression technique.

FIG. 15 illustrates a mapping block 550 using the approach described in the above-cited D. A. Sutherland et al. article where two ROMs are used to generate two outputs and an adder is used to combine the ROM outputs to generate the desired output. As illustrated in FIG. 15 for the sine output, with an (A+B+C)-bit input for $\bar{\omega}$, the (A+B) most significant bits of the input address a coarse ROM 552. As further illustrated in FIG. 15, the (A+C) bits of the input address a fine correction ROM 554. The (A+C) bits addressing the fine correction ROM 554 are obtained by concatenating the A most significant bits of $\bar{\omega}$ with the C least significant bits of $\bar{\omega}$. The results obtained from the two ROMs 552, 554 are added in an adder 556 to yield the desired output (e.g., $$\sin\frac{\pi}{4}\bar{\omega}.$$

This approach is referred to as Sunderland's compression technique.

Sunderland's compression technique is based on trigonometric approximations. The (A+B+C)-bit input $\bar{\omega}$ can be expressed as a sum of three angles (e.g., $\bar{\omega}=\alpha+\beta+\chi$), where α, β, and χ correspond to the numerical values represented by the A most significant bits, the middle B bits, and the C least significant bits of $\bar{\omega}$, respectively. Therefore, the value of $$\sin\frac{\pi}{4}\bar{\omega}$$

for the sine is determined in accordance with the following equation:

$$\sin\frac{\pi}{4}\bar{\omega} = \sin\left(\frac{\pi}{4}(\alpha+\beta+\chi)\right) = \sin\left(\frac{\pi}{4}(\alpha+\beta)\right)\cos\left(\frac{\pi}{4}\chi\right) + \cos\left(\frac{\pi}{4}(\alpha+\beta)\right)\sin\left(\frac{\pi}{4}\chi\right). \quad (3)$$

Equation (3) is further simplified by using the fact that $$\frac{\pi}{4}\chi$$

is a small angle since χ corresponds to the least significant bits of $\bar{\omega}$ and α>β by definition. Therefore, $\cos(\pi/4(\chi))\approx1$ and $\cos(\pi/4(\alpha+\beta))\approx\cos(\pi/4(\alpha))$. Applying these approximations to Equation (3) results in the following equation:

$$\sin\frac{\pi}{4}\bar{\omega} \approx \sin\left(\frac{\pi}{4}(\alpha+\beta)\right) + \cos\left(\frac{\pi}{4}\alpha\right)\sin\left(\frac{\pi}{4}\chi\right) \quad (4)$$

In Equation (4), the first term in the approximation is only a function of α and β, (e.g., the (A+B) most significant bits of $\bar{\omega}$), and the second term is only a function of α and χ (e.g., the (A+C) bits constituting the A most significant bits and the C least significant bits of $\bar{\omega}$). To obtain the sine output, the coarse ROM 552 in FIG. 15 contains the values corresponding to $\cos(\pi/4(\alpha+\beta))$, and the fine correction ROM 554 contains the values corresponding to $\cos(\pi/4(\alpha))\sin(\pi/4(\chi))$. The output is obtained by adding the outputs of the two ROMs 552 and 554 in the adder 556 according to Equation (4). A similar approach can be utilized for the generation of cosine instead of the sine at the output of the adder 556 in FIG. 15 by storing the appropriate values in the two ROMs.

The foregoing example of FIG. 15 with a 13-bit $\bar{\omega}$ illustrates the compression obtained by Sunderland's approach. The 13-bit input is partitioned such that A=4, B=5, and C=4 yields a coarse ROM 552 with $2^{A+B}=2^9=512$ entries and a fine correction ROM 554 with $2^{A+C}=2^8=256$ entries. Together, both ROMs have a total of 768 in contrast to a conventional single large ROM with a 13-bit input which has 8,192 ($2^{13}$) entries. Sunderland's approach requires 7,424 fewer entries stored in the ROMs, a reduction of 90.63%. A DDS utilizing Sunderland's approach with A=4, B=5, and C=4, and with the outputs of each of the coarse ROM 552 and the fine correction ROM 554 rounded to 14 bits yields an SFDR of greater than 101 dBc. Therefore, a DDS with a 32-bit input tw, a 14-bit output resolution, and an SFDR of 92 dBc can be achieved with a phase truncation of W=16 by utilizing Sunderland's approach with A=4, B=5, and C=4.

The case detection and output selection technique described above can be applied to either one or both of the resulting smaller ROMs in Sunderland's approach to yield an efficient overall architecture for the DDS. Furthermore, by implementing the coarse ROM 552 and the fine correction ROM 554 using the A=4 bits for case detection for both ROMs, all circuitry associated only with these A=4 bits can be shared between the coarse ROM 552 and the fine correction ROM 554. In other embodiments, the case detectors for the two ROMs may operate on two different sets of bits; in which case, a fourth set of bits (D, not shown) is utilized and different numbers of sub-functions may be produced by the two ROMs. The fourth set of bits D and any of the sets of bits A, B and C may have common bits. In the illustrated embodiment, both the coarse ROM 552 and the fine correction ROM 554 are broken down into $2^A=2^4=16$ sub-functions (e.g., the coarse ROM 552 and the fine correction ROM 554 use K=4 bits for case detection). Accordingly, in such embodiments, the same case-detection circuitry can be used by the coarse ROM 552 and the fine correction ROM 554. By choosing $2^A=2^4=16$ sub-functions, each of the coarse ROM 552 and the fine correction ROM 554 may be implemented as an efficient ROM similar to the architecture illustrated in FIG. 14. In this embodiment, each of the sub-functions (small ROMs) implementing the coarse ROM 552 has $2^B=2^5=32$ entries, and each of the sub-functions (small ROMs) implementing the fine correction ROM 554 has $2^C=2^4=16$ entries.

The architecture of an SCMF 600 that utilizes Sunderland's approach and applies the case detection and output selection technique is illustrated in FIG. 16, which comprises FIGS. 16A and 16B. The SCMF 600 in FIG. 16 generates the sine and cosine at respective outputs in response to an input value representing $\bar{\omega}$, which is received in an input register 602. In the illustrated embodiment, the sub-functions block 610 implementing the coarse ROM store the coarse values for both the sine and the cosine, and the sub-functions block 612 implementing the fine correction ROM store the correction values for both the sine and the cosine. In an alternative embodiment in which only the sine or only the cosine is output, the ROMs need to store only the values associated with the desired output.

As further illustrated in FIG. 16, the coarse ROM sub-functions block 610 receives selected bits of the input value via a coarse ROM data registering network 614. Similarly, the fine correction ROM sub-functions block 612 receives selected bits of the input value via a fine correction ROM data registering network 616. The outputs of the sub-functions in the coarse ROM sub-functions block 610 are routed through a coarse ROM output selector 620. The outputs of the sub-functions in the fine correction ROM sub-functions block 612 are routed through a fine correction ROM output selector 622. The clocks and enables that control the two sub-functions blocks 610, 612, the two data registering networks 614, 616, and the two output selectors 620, 622 are generated by a common 4-bit (16-case) case detector 630. The case detector 630 comprises a clock generator 632 and a select signal generator 634, which operate as described above. The coarse cosine values from the coarse ROM output selector 620 and the fine correction cosine values from the fine correction ROM output selector 622 are added in a cosine adder 640 to generate the cosine output $$\left(\text{e.g., } \cos\frac{\pi}{4}\bar{\omega}\right)$$

via a register 642. The coarse sine values from the coarse ROM output selector 620 and the fine correction sine values from the fine correction ROM output selector 622 are added in a sine adder 644 to generate the sine output $$\left(\text{e.g., } \sin\frac{\pi}{4}\bar{\omega}\right)$$

via a register 646.

Selected paths in FIG. 16 are highlighted with dashed lines to illustrate the toggling activity when the four most significant bits of $\bar{\omega}$ are "1010." Again, it should be understood that the dashed lines in the data registering network 614 for the coarse ROMs and the dashed lines in the data registering network 616 for the fine correction ROMs represent the respective propagation paths of the data through the two stages of each data registering network during two consecutive clock cycles. The data registering network 614 corresponding to the coarse ROM propagates the five bits following the four most significant bits of $\bar{\omega}$ to a ROM C10, and the data registering network 616 for the fine correction ROM propagates the four least significant bits of $\bar{\omega}$ to a ROM F10. In FIG. 16, the input to the ROM C10 is identified as $\beta_{1010}$, and the input to the ROM F10 is identified as $\chi_{1010}$, where the subscript "1010" corresponds to illustrated "case" of the four most significant bits of the input $\bar{\omega}$. The inputs to the other ROMs are identified in a similar manner.

In FIG. 16, the inputs to the ROMs C00 through C15 in the coarse ROM sub-functions block 610 are 5 bits. The inputs to the ROMs F00 through F15 in the fine correction ROM sub-functions block 612 are 4 bits. Hence, in similar manner to the ROMs in FIG. 14, each ROM in FIG. 16 spans a limited range of phase angles. Accordingly, a number of the most significant bits stored in the ROMs will be constants or will be trivial functions of the address bits. This property was illustrated by the tabulated contents of the ROM 43 in Table 1.

The described method of case detection and output selection can be applied to the implementation of any ROM in a DDS architecture. For example, H. T. Nicholas, III, and H. Samueli, "A 150-MHz Direct Digital Frequency Synthesizer in 1.25-μm CMOS with −90-dBc Spurious Performance," *IEEE Journal of Solid-State Circuits*, Vol. 26, pp. 1959-1969, December 1991, and A. Bellaouar, M. S. O'brecht, A. M. Fahim, and M. I. Elmasry, "Low-Power Direct Digital Frequency Synthesis for Wireless Communications," *IEEE Journal of Solid-State Circuits*, Vol. 35, pp. 385-390, March 2000, describe DDS architectures that utilize ROMs. The architectures described in the articles may be improved by employing the above-described case detection and output selection technique for some or all of the ROMs incorporated in the architectures.

Systems having identical functional blocks are often used in parallel for increased throughput as well as for other system requirements. For such cases, the described method of case detection and output selection enables a variety of implementation choices to be considered to collectively maximize the benefit from their corresponding desirable properties. For example, a DDS implementation using the case detection and output selection method (case-detection DDS) may have very low power consumption but occupy a larger area when compared to a different implementation technique, such as, for example, the CORDIC method described in J. Voider, "The CORDIC Trigonometric Computing Technique," *IEEE Trans. Computers*, Vol. EC-8, pp. 330-334, September 1959. For a 2-path system, one of the paths may be implemented using the disclosed case-detection DDS and the other path may be implemented using a CORDIC DDS. This hybrid approach is illustrated in FIG. 17 for a hybrid function generator 650. The hybrid function generator includes a first DDS 652, which incorporates the case detection and output selection method described herein, and includes a second DDS 654, which uses an alternative function generation method (e.g., the CORDIC DDS method). The illustrated hybrid solution, for example, may occupy less area and consume more power than the system with both paths implemented using the disclosed case-detection DDS. On the other hand, the illustrated hybrid solution may occupy more area and consume less power compared to the system with both paths implemented using the CORDIC DDS. For multipath designs, an array of combinations is available for the implementation of each functional path to achieve the desired balance of various efficiencies offered by each implementation method. The case detection and output selection method offers an additional bonus beyond the ability to carefully balance the available implementation techniques.

Although the sub-function generators in the case detection and output selection method are not identical in functionality, for the purpose of the following discussion, the sub-function generators in the case detection and output selection method can be considered to be individual paths (as shown in FIG. 1) that collectively constitute the overall system. Accordingly, the case detection and output selection method can also be considered to be a "multipath"-like approach. This consideration is advantageously used to create multipath designs that offer benefits beyond the benefits obtained from the straightforward hybrid solution. One example of a multipath design is a 2-path system with a master path and a slave path. FIG. 18 illustrates an embodiment of a hybrid multipath function generator 660 in accordance with such a design. The function generator 660 includes a master path 662 that receives an input value $x_1$. The master path 662 is implemented with a case detector 664, a sub-function generation block 666 and an output selector 668 in accordance with the case detection and output selection technique described above. The function generator 660 includes a slave path 670 that receives an input value $x_2$. The slave path 670 may also be implemented with a case detector 672 and an output selector 674. The slave path 670 includes an alternative function generation block 676 that performs function generation using the desired alternative method (e.g., a CORDIC DDS). The slave path 670 includes an output multiplexer 678 that selects either the output of the block 676 or the output of the output selector 674 to provide as the output of the salve path 670.

The function generator 660 includes a simple comparator 680 to compare the detected cases for the master path 662 and the slave path 670. When the detected cases in the master path 662 and the slave path 670 are the same and the inputs to the sub-function generators for the master path 662 and the slave path 670 are different, the alternative method for the function mapping of the slave path 670 via the block 676 is used. In particular, the output multiplexer 678 is controlled to couple the output of the block 676 to the output of the slave path 670. On the other hand, when the detected cases are different such that the master path 662 and the slave path 670 require different sub-function generators, two sub-function generators are activated in the master path 662 to retrieve the answers for both the master path 662 and the slave path 670. The slave path output selector 674 selects the output of the appropriate sub-function generator in the master path and routes it to the output of the slave path 670 via the output multiplexer 678. In systems where the same mapping needs to be performed for the master path 662 and the slave path 670, the same sub-function generator in the master path 662 provides the results for both paths.

The system illustrated in FIG. 18 can be generalized for an arbitrary number of slave paths. The comparator for each slave path can be designed to accomplish a desired selection criterion. For example, a system utilizing a single master path and S slave paths may incorporate comparators that compare all of the detected cases corresponding to the input of the master path and the inputs of the S slave paths. If any two of the detected cases are the same and the inputs to the sub-function generators for the detected cases are different (e.g. the inputs are in conflict), the alternative methods for the function mapping of the slave paths are used (e.g., the master path is not shared for any one of the slave paths). Alternatively, the slave paths can be assigned a priority number 1 through S (where 1 denotes the highest priority and S denotes the lowest priority) and the comparators can operate as follows. The comparator of slave path with priority 1 only checks if its input is in conflict with the master path's input. If yes, then it uses its alternative method for the function mapping. If not, then it uses a sub-function generator in the master path to retrieve the desired answer. The comparator of slave path with priority n checks if its input is in conflict with the master path's input or any one of the n−1 higher-priority slave path inputs. If yes, then it uses its alternative method for the function mapping. If not, then it uses a sub-function generator in the master path to retrieve the desired answer. Hence, the comparator of slave path with priority S checks if its input is in conflict with any one of the other paths while the comparator of slave path with priority 1 only checks if its input is in conflict with the master path.

It should also be noted that the system illustrated in FIG. 18 can be generalized for an arbitrary number of master paths. For example, a 4-path system may utilize 2 master paths and 2 slave paths. Each slave path can be coupled with one master path. Hence, many different combinations utilizing different number of master and slave paths and different criteria for case comparisons are possible in a multipath system similar to FIG. 18.

It is possible that the detected cases are the same and the two data inputs are the same, in which case the same function generator could provide the data outputs for both paths; however, in order to simplify the comparison of the inputs, the comparator 680 in the exemplary embodiment only compares the cases to which the inputs of the master and slave paths belong and does not detect the very unlikely occurrence of the inputs of both the master path and the slave path being identical. The simplified comparison is accomplished by processing the enable signals generated from the case detectors of the master and slave paths. For example, the case detectors 664, 672 of FIG. 18 are advantageously configured in accordance with the structure illustrated in FIG. 11A and FIG. 11B. Thus, the case detectors 664, 772 use the three most significant bits of the input for case detection and generate the enable signals en_000, en_001, en_111 to control the enabling and disabling of the sub-functions $f_{000}, f_{001}, \ldots,$ and $f_{111}$. In the hybrid master/slave structure of the generator 660 in FIG. 18, the enable signals that control the enabling and disabling of the sub-functions of the master path 662 need to consider the enable signals from the case detector 664 in the master path 662 and the enable signals from the case detector 672 in the slave path 670.

FIG. 19 illustrates logic 690 to generate enable signals for the sub-functions from the enable signals generated by the master path 662 and the slave path 670. In FIG. 19, the enable signals for the master path 662 are identified as $en_{M\_}000$, $en_{M\_}001 \ldots en_{M\_}111$, and the enable signals for the slave path 670 are identified as $en_{S\_}000, en_{S\_}001 \ldots en_{S\_}111$. The corresponding enable signals en_000, en_001 . . . en_111 that control the sub-functions are obtained from $en_{M\_}iii$ and $en_{S\_}jjj$, signals by a plurality of OR gates 692(1), 692(2), . . . 692(8). The enables from the master path 662 and the slave path 670 are provided as pairs to the inputs of the OR gates. Each OR gate 692(1), 692(2) . . . receives a pair of enables comprising a master path enable and a slave path enable. The two enables in each pair have like suffixes (e.g., $en_{M\_}000$ and $en_{S\_}000$ are applied to the OR gate 692(1), $en_{M\_}001$ and $en_{S\_}001$ are applied to the OR gate 692(2), and so on). If either one of the enables $en_{M\_}iii$ and $en_{S\_}jjj$ in an enable pair on the input of an OR gate is active, the corresponding enable en_lll for the sub-function is activated at the output of the OR gate. When the active enable signal $en_{M\_}iii$ for the master path 662 and the active enable signal $en_{S\_}jjj$ for the slave path 670 are the same during any given clock cycle (e.g., iii=jjj), only one of the output enable signals en_lll (lll=iii=jjj) is active during that clock cycle and the remaining enables will be inactive. When the active enable signal $en_{M\_}iii$ for the master path 662 and the active enable signal $en_{S\_}jjj$ for the slave path 670 are different during any given clock cycle (e.g., iii≠jjj), two output enable signals (e.g., en_lll$_1$ and en_lll$_2$, where lll$_1$=iii and lll$_2$=jjj) will be active during that clock cycle and the remaining enables will be inactive.

The alternative function generator 676 of FIG. 18 is activated during any clock cycle when the active master path enable $en_{M\_}iii$ and the active slave path enable $en_{S\_}jjj$ have the same suffix (e.g., iii=jjj), which indicates that the cases detected in both the master path 632 and the slave path 670 are the same. This condition where both enables in an enable pair are active is detected by the logic 700 illustrated in FIG. 20. The logic 700 comprises a plurality of AND gates 702(1), 702(2), . . . 702(8). Each AND gate has a first input that receives an enable signal from the master path 662 and a second input that receives an enable signal from the slave path 670, wherein the suffixes for the enable signals applied to a respective AND gate are the same. For example, the AND gate 702(1) receives the $en_{M\_}000$ signal and the $en_{S\_}000$ signal, the AND gate 702(2) receives the $en_{M\_}001$ signal and the $en_{S\_}001$ signal, and so on. The outputs of the AND gates 702(1) . . . 702(8) are applied as inputs to an OR gate 704 having eight inputs for the illustrated embodiment. The output of the OR gate 704 is an enable slave path signal (en$_{Slave\ Path}$) that is applied to the alternative function generation block 676 in the slave path 670 in FIG. 18 to activate the block 676. The same en$_{Slave\_Path}$ signal generated in FIG. 20 is also advantageously applied to the select input of the output multiplexer 678 in the slave path of FIG. 18 to cause the output multiplexer 678 to select the output of the block 676 as the output of the slave path 670.

As discussed above, when the suffixes of the master path enable en$_{M\_}$iii and the slave path enable en$_{S\_}$jjj are different (iii≠jjj), the master path is able to perform a first sub-function based on the case detected by the master path case detector 664 and is able to perform a second sub-function based on the case detected by the slave path case detector 672. Since the data input to the master path 662 is likely to be different than the data applied to the slave path 670, the data registering networks (e.g., the data registering network 204 in FIG. 11A and FIG. 11B) in the master case detector 664 and the slave case detector 672 advantageously provide two inputs for each sub-function in the sub-functions block 666 through the comparator 680. As illustrated in FIG. 21, the two inputs to the sub-functions of the master path 662 are advantageously coupled through a respective multiplexer network 750 positioned immediately before the input to the respective sub-function blocks. The multiplexer network 750 provides a 2-to-1 multiplexing function at the input of the sub-function block. The multiplexer network 750 includes a 2-to-1 multiplexer 752 having the input x$_{M\_}$i from the master path 662 on one input and having the input x$_{S\_}$i from the slave path 670. When the select input to the multiplexer 752 is "0," the input data from the master path 662 is routed into the sub-function generator and when the select input is "1," the input data from the slave path 670 is routed into the sub-function generator. The output of the multiplexer 752 is the input x$_i$ to the respective sub-function (not shown).

The multiplexer 752 is responsive to the enable en$_{M\_}$i from the master path 662 and the enable en$_{S\_}$i from the slave path 670. When the master path enable en$_{M\_}$i is active, the multiplexer 752 routes the input x$_{M\_}$i from the master path 662 to the sub-function. When the master path enable en$_{M\_}$i is inactive and the slave path enable en$_{S\_}$i is active, the multiplexer 752 routes the input x$_{S\_}$i from the slave path 670 to the sub-function. In the preferred embodiment, when both enables are inactive, the output of the multiplexer 752 is maintained at the previously selected state to avoid unnecessary toggling of the multiplexer and the input to the respective sub-function. The multiplexer network 750 includes control logic 760, which operates in accordance with the illustrated truth table to maintain the selected state of the multiplexer 752 at its current state unless a previously inactive enable becomes active. As further illustrated in the truth table, an active master path enable en$_{M\_}$i overrides an active slave path enable en$_{S\_}$i.

If uniformly and randomly distributed input data are provided to the master and slave paths for a K-bit detection scheme, the probability that a conflict will occur between the master path and the slave path for the use of a specific one of the sub-function blocks such that the slave path is required to use the alternative function generation block 676 (FIG. 18) is less than $100/2^K$%. For example, for the 6-bit detection scheme of FIG. 14, $2^K=64$. Thus, the probability that the slave path 670 cannot use one of the sub-function generators in the master path 662 is less than 1.5625%. Therefore, even if the alternative function generation method for the slave path consumes significantly more power than the case detection and output selection method, it only needs to be operational less than $100/2^K$% of the time for a K-bit detection scheme (e.g., less than 1.5625% of the time for a (K=6)-bit detection scheme). Furthermore, since all of the functional blocks not necessary for the generation of the outputs during a particular clock cycle are disabled for maximal efficiency, the overall system benefits from the small-size of the alternative method used for the slave path.

One skilled in art will appreciate that the foregoing embodiments are illustrative of the present invention. The present invention can be advantageously incorporated into alternative embodiments while remaining within the spirit and scope of the present invention, as defined by the appended claims.

TABLE 1

Exemplary ROM contents for ROM 43 of FIG. 14

| ROM address | 14-bit Cosine | 14-bit Sine |
|---|---|---|
| 0000000 | 0.1101110100101 | 0.1000000011101 |
| 0000001 | 0.1101110100101 | 0.1000000011110 |
| 0000010 | 0.1101110100100 | 0.1000000011110 |
| 0000011 | 0.1101110100100 | 0.1000000011111 |
| 0000100 | 0.1101110100011 | 0.1000000100000 |
| 0000101 | 0.1101110100011 | 0.1000000100000 |
| 0000110 | 0.1101110100011 | 0.1000000100001 |
| 0000111 | 0.1101110100010 | 0.1000000100010 |
| 0001000 | 0.1101110100010 | 0.1000000100011 |
| 0001001 | 0.1101110100001 | 0.1000000100011 |
| 0001010 | 0.1101110100001 | 0.1000000100100 |
| 0001011 | 0.1101110100001 | 0.1000000100101 |
| 0001100 | 0.1101110100000 | 0.1000000100101 |
| 0001101 | 0.1101110100000 | 0.1000000100110 |
| 0001110 | 0.1101110011111 | 0.1000000100111 |
| 0001111 | 0.1101110011111 | 0.1000000100111 |
| 0010000 | 0.1101110011111 | 0.1000000101000 |
| 0010001 | 0.1101110011110 | 0.1000000101001 |
| 0010010 | 0.1101110011110 | 0.1000000101001 |
| 0010011 | 0.1101110011110 | 0.1000000101010 |
| 0010100 | 0.1101110011101 | 0.1000000101011 |
| 0010101 | 0.1101110011101 | 0.1000000101011 |
| 0010110 | 0.1101110011100 | 0.1000000101100 |
| 0010111 | 0.1101110011100 | 0.1000000101101 |
| 0011000 | 0.1101110011100 | 0.1000000101101 |
| 0011001 | 0.1101110011011 | 0.1000000101110 |
| 0011010 | 0.1101110011011 | 0.1000000101111 |
| 0011011 | 0.1101110011010 | 0.1000000101111 |
| 0011100 | 0.1101110011010 | 0.1000000110000 |
| 0011101 | 0.1101110011010 | 0.1000000110001 |
| 0011110 | 0.1101110011001 | 0.1000000110001 |
| 0011111 | 0.1101110011001 | 0.1000000110010 |
| 0100000 | 0.1101110011000 | 0.1000000110011 |
| 0100001 | 0.1101110011000 | 0.1000000110011 |
| 0100010 | 0.1101110011000 | 0.1000000110100 |
| 0100011 | 0.1101110010111 | 0.1000000110101 |
| 0100100 | 0.1101110010111 | 0.1000000110101 |
| 0100101 | 0.1101110010110 | 0.1000000110110 |
| 0100110 | 0.1101110010110 | 0.1000000110111 |
| 0100111 | 0.1101110010110 | 0.1000000111000 |
| 0101000 | 0.1101110010101 | 0.1000000111000 |
| 0101001 | 0.1101110010101 | 0.1000000111001 |
| 0101010 | 0.1101110010100 | 0.1000000111010 |
| 0101011 | 0.1101110010100 | 0.1000000111010 |
| 0101100 | 0.1101110010100 | 0.1000000111011 |
| 0101101 | 0.1101110010011 | 0.1000000111100 |
| 0101110 | 0.1101110010011 | 0.1000000111100 |
| 0101111 | 0.1101110010010 | 0.1000000111101 |
| 0110000 | 0.1101110010010 | 0.1000000111110 |
| 0110001 | 0.1101110010010 | 0.1000000111110 |
| 0110010 | 0.1101110010001 | 0.1000000111111 |
| 0110011 | 0.1101110010001 | 0.1000001000000 |
| 0110100 | 0.1101110010000 | 0.1000001000000 |
| 0110101 | 0.1101110010000 | 0.1000001000001 |
| 0110110 | 0.1101110010000 | 0.1000001000010 |
| 0110111 | 0.1101110001111 | 0.1000001000010 |
| 0111000 | 0.1101110001111 | 0.1000001000011 |
| 0111001 | 0.1101110001110 | 0.1000001000100 |
| 0111010 | 0.1101110001110 | 0.1000001000100 |
| 0111011 | 0.1101110001110 | 0.1000001000101 |
| 0111100 | 0.1101110001101 | 0.1000001000110 |
| 0111101 | 0.1101110001101 | 0.1000001000110 |
| 0111110 | 0.1101110001100 | 0.1000001000111 |

TABLE 1-continued

Exemplary ROM contents for ROM 43 of FIG. 14

| ROM address | 14-bit Cosine | 14-bit Sine |
|---|---|---|
| 0111111 | 0.1101110001100 | 0.1000001001000 |
| 1000000 | 0.1101110001100 | 0.1000001001000 |
| 1000001 | 0.1101110001011 | 0.1000001001001 |
| 1000010 | 0.1101110001011 | 0.1000001001010 |
| 1000011 | 0.1101110001011 | 0.1000001001010 |
| 1000100 | 0.1101110001010 | 0.1000001001011 |
| 1000101 | 0.1101110001010 | 0.1000001001100 |
| 1000110 | 0.1101110001001 | 0.1000001001100 |
| 1000111 | 0.1101110001001 | 0.1000001001101 |
| 1001000 | 0.1101110001000 | 0.1000001001110 |
| 1001001 | 0.1101110001000 | 0.1000001001111 |
| 1001010 | 0.1101110001000 | 0.1000001001111 |
| 1001011 | 0.1101110000111 | 0.1000001010000 |
| 1001100 | 0.1101110000111 | 0.1000001010001 |
| 1001101 | 0.1101110000110 | 0.1000001010001 |
| 1001110 | 0.1101110000110 | 0.1000001010010 |
| 1001111 | 0.1101110000110 | 0.1000001010011 |
| 1010000 | 0.1101110000101 | 0.1000001010011 |
| 1010001 | 0.1101110000101 | 0.1000001010100 |
| 1010010 | 0.1101110000100 | 0.1000001010101 |
| 1010011 | 0.1101110000100 | 0.1000001010101 |
| 1010100 | 0.1101110000100 | 0.1000001010110 |
| 1010101 | 0.1101110000011 | 0.1000001010111 |
| 1010110 | 0.1101110000011 | 0.1000001010111 |
| 1010111 | 0.1101110000010 | 0.1000001011000 |
| 1011000 | 0.1101110000010 | 0.1000001011001 |
| 1011001 | 0.1101110000010 | 0.1000001011001 |
| 1011010 | 0.1101110000001 | 0.1000001011010 |
| 1011011 | 0.1101110000001 | 0.1000001011011 |
| 1011100 | 0.1101110000000 | 0.1000001011011 |
| 1011101 | 0.1101110000000 | 0.1000001011100 |
| 1011110 | 0.1101110000000 | 0.1000001011101 |
| 1011111 | 0.1101101111111 | 0.1000001011101 |
| 1100000 | 0.1101101111111 | 0.1000001011110 |
| 1100001 | 0.1101101111110 | 0.1000001011111 |
| 1100010 | 0.1101101111110 | 0.1000001011111 |
| 1100011 | 0.1101101111110 | 0.1000001100000 |
| 1100100 | 0.1101101111101 | 0.1000001100001 |
| 1100101 | 0.1101101111101 | 0.1000001100001 |
| 1100110 | 0.1101101111100 | 0.1000001100010 |
| 1100111 | 0.1101101111100 | 0.1000001100011 |
| 1101000 | 0.1101101111100 | 0.1000001100011 |
| 1101001 | 0.1101101111011 | 0.1000001100100 |
| 1101010 | 0.1101101111011 | 0.1000001100101 |
| 1101011 | 0.1101101111010 | 0.1000001100101 |
| 1101100 | 0.1101101111010 | 0.1000001100110 |
| 1101101 | 0.1101101111010 | 0.1000001100111 |
| 1101110 | 0.1101101111001 | 0.1000001100111 |
| 1101111 | 0.1101101111001 | 0.1000001101000 |
| 1110000 | 0.1101101111000 | 0.1000001101001 |
| 1110001 | 0.1101101111000 | 0.1000001101010 |
| 1110010 | 0.1101101111000 | 0.1000001101010 |
| 1110011 | 0.1101101110111 | 0.1000001101011 |
| 1110100 | 0.1101101110111 | 0.1000001101100 |
| 1110101 | 0.1101101110110 | 0.1000001101100 |
| 1110110 | 0.1101101110110 | 0.1000001101101 |
| 1110111 | 0.1101101110110 | 0.1000001101110 |
| 1111000 | 0.1101101110101 | 0.1000001101110 |
| 1111001 | 0.1101101110101 | 0.1000001101111 |
| 1111010 | 0.1101101110100 | 0.1000001110000 |
| 1111011 | 0.1101101110100 | 0.1000001110000 |
| 1111100 | 0.1101101110011 | 0.1000001110001 |
| 1111101 | 0.1101101110011 | 0.1000001110010 |
| 1111110 | 0.1101101110011 | 0.1000001110010 |
| 1111111 | 0.1101101110010 | 0.1000001110011 |

What is claimed is:

1. A method of generating a generator output value in response to a generator input value, comprising the steps of:
receiving by a plurality of sub-functions generators of a digital integrated circuit system, a respective sub-function input value responsive to the generator input value and providing a respective sub-function output value responsive to the respective sub-function input value;
identifying an input case responsive to the generator input value;
selecting at least one sub-function generator in response to the input case;
inhibiting at least one sub-function generator in response to the input case;
applying a value responsive to the generator input value to an input of the selected sub-function generator;
blocking the value responsive to the generator input value from being applied to an input of the inhibited sub-function generator;
outputting a value from the selected sub-function generator; and
providing a generator output value responsive to the value from the selected sub-function generator.

2. The method as defined in claim 1, further comprising inhibiting the non-selected sub-function generator from providing a respective sub-function output value by suppressing data transitions at the input of the non-selected sub-function generator.

3. The method as defined in claim 1, further comprising selectively enabling the clock input to the selected sub-function generator and inhibiting the non-selected sub-function generator from providing a respective sub-function output value by disabling at least one clock input to the non-selected sub-function generator.

4. The method as defined in claim 1, further comprising selectively suppressing routing of a value responsive to the second portion of the system input value to the input of at least one non-selected sub-function generator.

5. The method as defined in claim 4, further comprising selectively generating a plurality of clock signals and selectively activating only clock signals applied to selected clocked registers in a plurality of register stages in a data path from a data input to the inputs of the selected sub-function generator.

6. The method as defined in claim 1, further comprising:
controlling an output selector comprising a plurality of selector inputs and at least one selector output, each selector input coupled to the output of a respective sub-function generator;
selectively routing the output value of the selected sub-function generator to the at least one selector output; and
producing the generator output value responsive to the output value on the at least one selector output.

7. The method as defined in claim 6, wherein the output selector comprises a plurality of multiplexer stages, at least a first multiplexer stage comprising a plurality of multiplexers, each multiplexer in the first multiplexer stage having a respective first input and at least a respective second input, a respective output, and a respective selection input that determines whether data at the first input or data at the second input is coupled to the output, and wherein the method further comprises:
controlling the selection input to at least one multiplexer in the first multiplexer stage to enable data transitions on the respective output of at least one selected multiplexer in the first multiplexer stage and to inhibit data transitions on the respective output of at least one non-selected multiplexer in the first multiplexer stage.

8. The method as defined in claim 7, wherein the generator input value comprises a plurality of bits, and wherein the method further comprises:
controlling the selection signals to the at least one multiplexer in the plurality of multiplexer stages in response to a portion of the generator input value.

9. The method as defined in claim 1, wherein the first portion of the generator input value comprises at least one bit of a plurality of data bits, and the second portion of the generator input value comprises at least another bit of the plurality of data bits.

10. A method of generating a system output value from a system input value, comprising:
receiving by a digital integrated circuit system the system input value;
responding to a first portion of the system input value to selectively route a value responsive to at least a second portion of the system input value to the input of at least one selected sub-function generator identified by the first portion;
suppressing transitions of data on the input of at least one non-selected sub-function generator or disabling at least one non-selected sub-function generator by disabling an input to the non-selected sub-function generator;
selecting an output value provided by the at least one selected sub-function generator; and
providing by said digital integrated circuit system the selected respective output value as the system output value.

11. A method of digitally synthesizing a frequency, comprising:
accumulating by a digital integrated circuit system a phase in response to a tuning word to produce a sequence of digital values representing a sequence of phase angles in a limited angular range; and
mapping by said digital integrated circuit system the sequence of phase angles to at least one sequence of values representing at least one of the sine and the cosine of each phase angle in the sequence of phase angles as a mapping function output, the mapping step comprising:
selecting at least one selected sub-function generator of a plurality of sub-function generators in response to at least a first portion of a digital value representing a phase angle in the sequence of phase angles;
inhibiting at least one non-selected sub-function generator in response to the first portion;
applying a value in response to at least a second portion of the digital value as an input value to the selected sub-function generator;
generating a sub-function output value from the selected sub-function generator; and
outputting a value responsive to the sub-function output value as the mapping function output.

12. The method of digitally synthesizing a frequency as defined in claim 11, further comprising inhibiting the non-selected sub-function generator from providing a respective sub-function output value by suppressing data transitions at the input of the non-selected sub-function generator.

13. The method of digitally synthesizing a frequency as defined in claim 11, further comprising selectively enabling the clock input to the selected sub-function generator and inhibiting the non-selected sub-function generator from providing a respective sub-function output value by disabling at least one clock input to the non-selected sub-function generator.

14. The method of digitally synthesizing a frequency as defined in claim 11 further comprising selectively suppressing routing of a value responsive to the second portion of the digital value representing a phase angle in the sequence of phase angles to the input of at least one non-selected sub-function generator.

15. The method of digitally synthesizing a frequency as defined in claim 14, further comprising selectively generating a plurality of clock signals and selectively activating only clock signals applied to selected clocked registers in a plurality of register stages in a data path from a data input to the inputs of the selected sub-function generator.

16. The method of digitally synthesizing a frequency as defined in claim 11, wherein the control system includes a data registering network that selectively prevents routing a value responsive to the second portion of the digital value representing a phase angle in the sequence of phase angles to the input of at least one non-selected sub-function generator.

17. The method of digitally synthesizing a frequency as defined in claim 11, further comprising:
controlling an output selector comprising a plurality of selector inputs and at least one selector output, each selector input coupled to the output of a respective sub-function generator;
selectively routing the output value of the selected sub-function generator to the at least one selector output; and
producing the generator output value responsive to the output value on the at least one selector output.

18. The method of digitally synthesizing a frequency as defined in claim 11 wherein the at least a first plurality of sub-function generators comprises a first plurality of sub-function generators and a second plurality of sub-function generators, the method further comprising:
enabling at least a first sub-function generator in the first plurality of sub-function generators to generate a first value representing a coarse component of a sine value, a coarse component of a cosine value, or the coarse component of the sine value and the coarse component of a cosine value;
enabling at least a second sub-function generator in the second plurality of sub-function generators to generate a second value representing a fine correction component of the sine value, a fine correction component of the cosine value, or the fine correction component of the sine value and the fine correction component of the cosine value; and
producing the sine value, the cosine value, or the sine value and the cosine value responsive to the respective coarse component and the respective fine correction component.

19. The method of digitally synthesizing a frequency as defined in claim 18, wherein the digital value representing a phase angle comprises a first plurality of bits, a second plurality of bits, and a third plurality of bits, the method further comprising:
enabling the first sub-function generator in the first plurality of sub-function generators and enabling the second sub-function generator in the second plurality of sub-function generators in response to the first plurality of bits;
generating the coarse component value in response to the second plurality of bits; and
generating the fine correction component in response to the third plurality of bits.

20. The method of digitally synthesizing a frequency as defined in claim 18, wherein the digital value representing a phase angle comprises a first plurality of bits, a second plurality of bits, a third plurality of bits, and a fourth plurality of bits, the method further comprising:
enabling the first sub-function generator in the first plurality of sub-function generators in response to the first plurality of bits;
enabling the second sub-function generator in the second plurality of sub-function generators in response to the second plurality of bits;
generating the coarse component value in response to the third plurality of bits; and
generating the fine correction component in response to the fourth plurality of bits.

* * * * *